US012647658B1

(12) United States Patent
Mogill

(10) Patent No.: US 12,647,658 B1
(45) Date of Patent: Jun. 2, 2026

(54) APPARATUS AND METHOD FOR AUTOMATIC VIDEO PRODUCTION

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/349,220

(22) Filed: Oct. 3, 2025

(51) Int. Cl.
| | |
|---|---|
| *H04N 21/854* | (2011.01) |
| *G06V 10/764* | (2022.01) |
| *G06V 10/77* | (2022.01) |
| *G10L 15/26* | (2006.01) |
| *H04N 21/44* | (2011.01) |
| *H04N 21/81* | (2011.01) |

(52) U.S. Cl.
CPC ......... *H04N 21/854* (2013.01); *G06V 10/764* (2022.01); *G06V 10/7715* (2022.01); *G10L 15/26* (2013.01); *H04N 21/44016* (2013.01); *H04N 21/816* (2013.01)

(58) Field of Classification Search
CPC .......... H04N 21/854; H04N 21/44016; H04N 21/816; G06V 10/764; G06V 10/7715; G10L 15/26
USPC ........................................................ 725/116
See application file for complete search history.

(56) References Cited

U.S. PATENT DOCUMENTS

| | | | | |
|---|---|---|---|---|
| 10,911,596 | B1 * | 2/2021 | Do ........................... G10L 17/00 |
| 11,034,357 | B2 * | 6/2021 | Lakshmi Narayanan ................... G06T 7/11 |
| 11,158,308 | B1 * | 10/2021 | Bissell .................... G10L 15/22 |
| 11,259,029 | B2 * | 2/2022 | Zhou ....................... H04N 19/12 |
| 11,769,528 | B2 * | 9/2023 | Patterson ............... G06V 10/045 386/278 |
| 12,154,598 | B1 * | 11/2024 | Warnick ............... G06V 40/161 |
| 2017/0039194 | A1 * | 2/2017 | Tschetter ................ G06F 16/93 |
| 2019/0130894 | A1 * | 5/2019 | Jin ........................... G10L 21/00 |
| 2021/0272599 | A1 * | 9/2021 | Patterson ............... G06N 3/091 |
| 2025/0246206 | A1 | 7/2025 | Duerr et al. |
| 2025/0279100 | A1 * | 9/2025 | Maizels ................. G06V 40/20 |

FOREIGN PATENT DOCUMENTS

| | | |
|---|---|---|
| CN | 120281988 A | 7/2005 |
| CN | 118540554 A | 8/2024 |
| CN | 118828054 A | 10/2024 |

* cited by examiner

*Primary Examiner* — Sahar Aqil Riaz
(74) *Attorney, Agent, or Firm* — CALDWELL LLC

(57) ABSTRACT

An apparatus and method for automated video production are disclosed. The apparatus includes at least a processor, and a memory, wherein the memory contains instructions configuring the at least a processor to receive raw content including a plurality of image frames and an associated speech waveform, extract one or more content features from the plurality of image frames and the associated speech waveform, assign at least a content identifier to at least a portion of the raw content as a function of the one or more content features, modify the speech waveform to generate a modified waveform using a speech model, generate at least a supplemental segment that is contextually matched to the at least a content identifier using a generative model, create a unified edit timeline, and generate a user interface including the unified edit timeline.

20 Claims, 8 Drawing Sheets

700

705 Receiving a Raw Content

710 Extracting One or More Content Features

715 Assigning at Least a Content Identifier

720 Modifying a Speech Waveform

725 Generating at Least a Supplemental Segment

730 Creating a Unified Edit Timeline

735 Generating a User Interface

APPARATUS AND METHOD FOR AUTOMATIC VIDEO PRODUCTION

FIELD OF THE INVENTION

The present invention generally relates to the field of video production. In particular, the present invention is directed to an apparatus and method for automatic video production.

BACKGROUND

Traditional video production is a labor-intensive process that requires extensive manual input from human editors. Editing is time-consuming, costly, and prone to subjective inconsistencies, particularly in applications that demand rapid turnaround. Several automated tools have emerged to address specific sub-tasks of video production. However, existing solutions typically operate in isolation, focusing on narrow functions rather than providing an integrated pipeline. As a result, users must manually combine outputs from disparate tools. Accordingly, there exists a need for improved systems and methods that can resolve the challenges.

SUMMARY OF THE DISCLOSURE

In some aspects, the techniques described herein relate to an apparatus for automated video production, the apparatus including at least a processor, and a memory communicatively connected to the at least a processor, wherein the memory contains instructions configuring the at least a processor to receive raw content including a plurality of image frames and an associated speech waveform, extract one or more content features from the plurality of image frames and the associated speech waveform, assign at least a content identifier to at least a portion of the raw content as a function of the one or more content features, modify the speech waveform to generate a modified waveform using a speech model, wherein generating the modified waveform includes detecting one or more filler words from the speech waveform, and removing the one or more filler words from the speech waveform, generate at least a supplemental segment that is contextually matched to the at least a content identifier using a generative model, wherein generating the at least a supplemental segment includes inserting the at least a supplemental segment into the plurality of image frames at a position aligned with the at least a content identifier, create a unified edit timeline including the at least a content identifier, the modified waveform, and the at least a supplemental segment, and generate a user interface including the unified edit timeline.

In some aspects, the techniques described herein relate to a method for automated video production, the method including receiving, using at least a processor, raw content including a plurality of image frames and an associated speech waveform, extracting, using the at least a processor, one or more content features from the plurality of image frames and the associated speech waveform, assigning, using the at least a processor, at least a content identifier to at least a portion of the raw content as a function of the one or more content features, modifying, using the at least a processor, the speech waveform to generate a modified waveform using a speech model, wherein generating the modified waveform includes detecting one or more filler words from the speech waveform, and removing the one or more filler words from the speech waveform, generating, using the at least a processor, at least a supplemental segment that is contextually matched to the at least a content identifier using a generative model, wherein generating the at least a supplemental segment includes inserting the at least a supplemental segment into the plurality of image frames at a position aligned with the at least a content identifier, creating, using the at least a processor, a unified edit timeline including the at least a content identifier, the modified waveform, and the at least a supplemental segment, and generating, using the at least a processor, a user interface including the unified edit timeline.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for automated video production. In some aspects, the techniques described herein relate to an apparatus for automated video production, the apparatus including at least a processor, and a memory communicatively connected to the at least a processor, wherein the memory contains instructions configuring the at least a processor to receive raw content including a plurality of image frames and an associated speech waveform, extract one or more content features from the plurality of image frames and the associated speech waveform, assign at least a content identifier to at least a portion of the raw content as a function of the one or more content features, modify the speech waveform to generate a modified waveform using a speech model, wherein generating the modified waveform includes detecting one or more filler words from the speech waveform, and removing the one or more filler words from the speech waveform, generate at least a supplemental segment that is contextually matched to the at least a content identifier using a generative model, wherein generating the at least a supplemental segment includes inserting the at least a supplemental segment into the plurality of image frames at a position aligned with the at least a content identifier, create a unified edit timeline including the at least a content identifier, the modified waveform, and the at least a supplemental segment, and generate a user interface including the unified edit timeline.

Aspects of the present disclosure allow for a video production process that integrates artificial intelligence for tagging, logging, editing, and audio cleanup. Raw footage is ingested into a media asset management system that uses AI-based auto-tagging engines to assign scene, speaker, and emotion labels. Speech enhancement models can automatically remove filler words ("ums" and "ahs"), while generative adversarial networks can create context-matched B-roll inserts. The resulting workflow reduces human editing time, increases consistency, and enables adaptive re-editing at scale while preserving a handcrafted brand aesthetic.

Exemplary embodiments illustrating aspects of the present disclosure are described below in the context of several specific examples.

Figure 1:
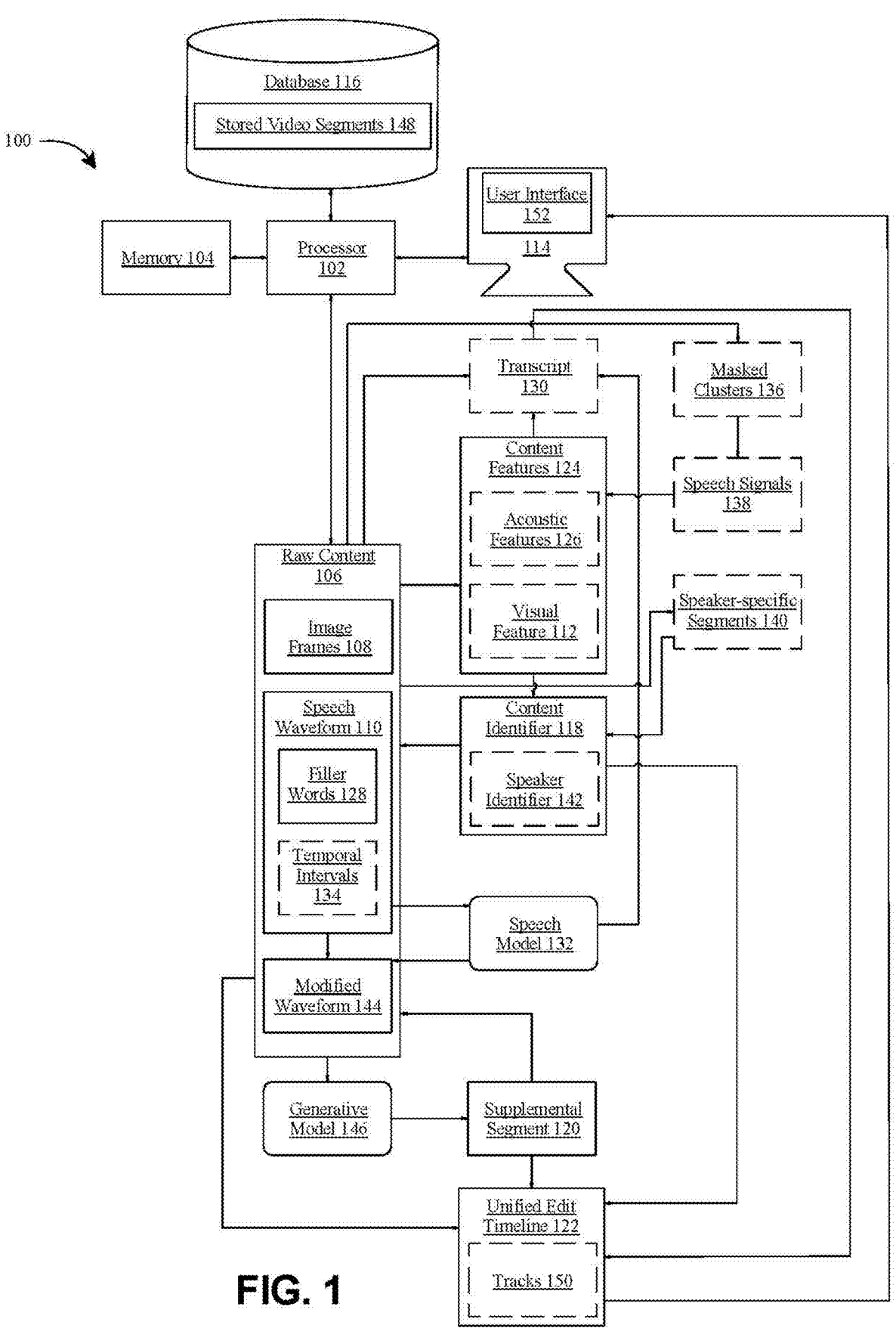
FIG. 1 illustrates a block diagram of an exemplary apparatus for automated video production.

Referring now to FIG. 1, an exemplary embodiment of apparatus 100 for automated video production is illustrated. or the purposes of this disclosure, "automated video production" is a computer-implemented process in which one or more processors generate, edit, and assemble audiovisual content with minimal or no direct manual intervention.

With continued reference to FIG. 1, apparatus 100 may include circuitry such as without limitation a processor 102 communicatively connected to a memory 104; for instance, circuitry may include and/or be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 104 contains instructions configuring processor 102 to receive raw content 106 including a plurality of image frames 108 and an associated speech waveform 110. For the purposes of this disclosure, a "raw content" is an unedited or minimally processed multimedia recording. As a non-limiting example, raw content 106 may include a video. As used in this disclosure, a "video" is an item of media, that includes a recording of moving visual images made digitally or on videotape. A video may be comprised of a plurality of scenes. As used in the current disclosure, a "scene" is a small segment of video. A scene may also represent a group of pictures. A video may include an image component, audio component, and related to a subject. In some cases, video may include a digital video, which may be communicated by way of digital signals, for example between computing devices which are communicatively connected with at least a network. Digital video may be compressed in order to optimize speed and/or cost of transmission of video. Videos may be compressed according to a video compression coding format (i.e., codec). Exemplary video compression codecs include without limitation H.26x codecs, MPEG formats, VVC, SVT-AV1, and the like. In some cases, compression of a video may be lossy, in which some information may be lost during compression. Alternatively or additionally, in some cases, compression of a video may be substantially lossless, where substantially no information is lost during compression. In some cases, raw content 106 may exist as a digital container file, such as MP4, MOV, AVI, or MKV, in which image frames 108 are stored as a video track and speech waveform 110 is stored as an audio track. In some cases, raw content 106 may preserve the original capture conditions, including ambient lighting, background sounds, camera movement, and unrefined speech patterns. In some cases, raw content 106 may lack editorial modifications such as cuts, transitions, or post-production enhancements. In some embodiments, raw content 106 may be produced during live events, interviews, presentations, or video conferences, where captured data reflects both visual features 112, such as gestures, objects, and environmental features, and auditory elements, such as spoken dialogue and incidental background noise.

With continued reference to FIG. 1, for the purposes of this disclosure, "image frames" are discrete digital representations of visual information that collectively form the video component of raw content. In some cases, each image frame 108 may correspond to a still image captured at a specific time interval, typically determined by a frame rate expressed in frames per second (fps). In some cases, image frames 108 may be encoded as pixel arrays organized in formats such as RGB, YUV, or grayscale, and may further be compressed using standards such as H.264, H.265, or VP9, depending on the file container of raw content 106. In some embodiments, image frames 108 may capture both static and dynamic elements of a scene, including speaker gestures, facial expressions, object motion, and environmental changes, providing visual context for synchronization with speech waveform 110. In some cases, each image frame 108 may be associated with metadata such as timecodes, resolution values, or scene identifiers.

With continued reference to FIG. 1, for the purposes of this disclosure, a "speech waveform" is an audio representation of spoken language associated with the raw content. In some cases, speech waveform 110 may include a digital audio signal that encodes spoken language captured during the recording of raw content 106. In some cases, speech waveform 110 may be represented in a time domain as a sequence of amplitude values sampled at discrete intervals. In some cases, speech waveform 110 may be represented a frequency domain as a spectral representation derived from Fourier or wavelet transforms. In some cases, speech waveform 110 may include continuous speech segments, pauses, filler words, and other acoustic phenomena characteristic of human speech. In some embodiments, speech waveform 110 may be monophonic, including the speech of a single speaker recorded through a microphone. In other embodiments, speech waveform 110 may be polyphonic, including overlapping or sequential utterances from multiple speakers.

In some cases, speech waveform 110 may exist in analog form, as a continuous pressure signal captured by a microphone, or in digital form, as a sequence of discrete samples stored in memory. In some cases, speech waveform 110 may be encoded as a stream of bits according to one or more sampling rates and quantization levels or compressed formats. As a non-limiting example, speech waveform 110 may be stored in a compressed audio format such as AAC or MP3 within a container file that also stores image frames 108. As a non-limiting example, speech waveform 110 may be preserved in a lossless format such as WAV or FLAC to maintain higher fidelity for subsequent processing. In another non-limiting example, speech waveform 110 may include both primary spoken words and background artifacts such as breaths, lip smacks, and ambient noise.

With continued reference to FIG. 1, in some embodiments, processor 102 may receive raw content 106 by accessing a memory location in which the raw content 106 is stored, such as a local storage device, a remote media server, or a cloud-based repository. In some cases, receiving raw content 106 may include loading a digital container file format, such as MP4, MOV, or MKV, wherein a container may include a plurality of image frames 108 encoded as a video track and associated speech waveform 110 encoded as an audio track. In some cases, processor 102 may parse the container file structure, separate image frames 108 and speech waveform 110 into individually addressable data streams and store the streams in memory for subsequent feature extraction and processing steps.

With continued reference to FIG. 1, in some embodiments, processor 102 may receive raw content 106 from a user device 114. For the purposes of this disclosure, a "user device" is any device a user uses to input data. As a non-limiting example, user device 114 may include a laptop, desktop, tablet, mobile phone, smart phone, smart watch, kiosk, screen, smart headset, or things of the like. For the purposes of this disclosure, a "user" is an individual or entity that uses an apparatus 100. As a non-limiting example, user may include a video editor, a content creator, such as a lecturer, interviewer, or filmmaker, enterprise entity, such as a media production company, advertising agency, or educational institution, and the like. In some embodiments, user device 114 may include an interface configured to receive inputs from a user. In some embodiments, a user may manually input any data into apparatus 100 using user device 114. In some embodiments, a user may have a capability to process, store or transmit any information independently.

With continued reference to FIG. 1, in some embodiments, processor 102 may receive raw content 106 from a database 116. As used in this disclosure, a "subject database" is a data structure configured to store data associated with a subject. As a non-limiting example, database 116 may store raw content 106, content identifier 118, supplemental segments 120, unified edit timeline 122, and the like. In one or more embodiments, database 116 may include inputted or calculated information and datum related to raw content 106. In some embodiments, a datum history may be stored in database 116. As a non-limiting example, the datum history may include real-time and/or previous inputted data related to raw content 106. As a non-limiting example, database 116 may include instructions from a user, who may be an expert user, a past user in embodiments disclosed herein, or the like, where the instructions may include examples of the data related to raw content 106.

With continued reference to FIG. 1, in some embodiments, processor 102 may be communicatively connected with database 116. For example, and without limitation, in some cases, database 116 may be local to processor 102. In another example, and without limitation, database 116 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connects directly, dynamically, and non-hierarchically to as many other computing devices as possible. A "network topology" as used in this disclosure is an arrangement of elements of a communication network.

With continued reference to FIG. 1, in some embodiments, database 116 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some cases, processor 102 may receive raw content 106 from a camera. For the purposes of this disclosure, a "camera" is an image capture device configured to record visual information. In some cases, camera may include optical elements such as a lens system, an image sensor such as a charge-coupled device (CCD) or complementary metal-oxide semiconductor (CMOS) sensor, and electronic circuitry for digitizing the captured imagery into a format suitable for storage or transmission. In some embodiments, camera may include processing logic for encoding plurality of image frames 108 using compression standards and multiplexing the encoded video with speech waveform 110 into a digital container format such as MP4, MOV, or AVI. As a non-limiting example, camera may be a professional-grade digital cinema camera used on a film set to capture multi-angle footage of actors, wherein image frames 108 record high-resolution scenes and speech waveform 110 contains spoken dialogue. In another example, camera may be a consumer smartphone camera that records a lecture, wherein image frames 108 depict a presenter at a podium and speech waveform 110 may include the presenter's voice along with incidental audience sounds. In yet another case, camera may be a webcam integrated into a laptop computer or video conferencing system, wherein image frames 108 capture participants in a remote meeting while speech waveform 110 records their spoken contributions.

Still referring to FIG. 1, in some cases, processor 102 may be configured to identify a series of image frames 108 of video. The series of image frames 108 may include a group of pictures having some degree of internal similarity, such as a group of pictures representing a scene. In some embodiments, comparing series of image frames 108 may include video compression by inter-frame coding. The "inter" part of the term refers to the use of inter frame prediction. This kind of prediction tries to take advantage from temporal redundancy between neighboring frames enabling higher compression rates. Video data compression is the process of encoding information using fewer bits than the original representation. Any compression may be either lossy or lossless. Lossless compression reduces bits by identifying and eliminating statistical redundancy. No information is lost in lossless compression. Lossy compression reduces bits by removing unnecessary or less important information. A device that performs data compression may be referred to as an encoder, and one that performs the reversal of the process (decompression) as a decoder. Data compression may be subject to a space-time complexity trade-off. For instance, a compression scheme for video may require expensive hardware for the video to be decompressed fast enough to be viewed as it is being decompressed, and the option to decompress the video in full before watching it may be inconvenient or require additional storage. Video data may be represented as a series of still image frames. Such data usually contains abundant amounts of spatial and temporal redundancy. Video compression algorithms attempt to reduce redundancy and store information more compactly.

Still referring to FIG. 1, inter-frame coding may function by comparing each image frame 108 in the video with another frame, which may include a previous frame. Individual frames of a video sequence may be compared between frames, and a video compression codec may send only the differences from a reference frame for frames other than the reference frame. If a frame contains areas where nothing has moved, a system may issue a short command that copies that part of a reference frame into the instant frame. If sections of a frame move in manner describable through vector mathematics and/or affine transformations, or differences in color, brightness, tone, or the like, an encoder may emit a command that directs a decoder to shift, rotate, lighten, or darken a relevant portion. An encoder may also transmit a residual signal which describes remaining more subtle differences from reference frame, for instance by subtracting a predicted frame generated through vector motion commands from the reference frame pixel by pixel. Using entropy coding, these residual signals may have a more compact representation than a full signal. In areas of video with more motion, compression may encode more data to keep up with a larger number of pixels that are changing. As used in this disclosure, reference frames are frames of a compressed video (a complete picture) that are used to define future frames. As such, they are only used in inter-frame compression techniques. Some modern video encoding standards, such as H.264/AVC, allow the use of multiple reference frames. This may allow a video encoder to choose among more than one previously decoded frame on which to base each macroblock in another frame.

With continued reference to FIG. 1, two frame types used in inter-fame coding may include P-frames and B-frames. A P-frame (Predicted picture) may hold only changes in an image from a reference frame. For example, in a scene where a car moves across a stationary background, only the car's movements may need to be encoded; an encoder does not need to store the unchanging background pixels in the P-frame, thus saving space. A B-frame (Bidirectional predicted picture) may save even more space by using differences between a current frame and both preceding and following frames to specify its content. An inter coded frame may be divided into blocks known as macroblocks. A macroblock may include a processing unit in image and video compression formats based on linear block transforms, such as without limitation a discrete cosine transform (DCT). A macroblock may consist of 16×16 samples, for instance as measured in pixels, and may be further subdivided into transform blocks, and may be further subdivided into prediction blocks. Formats which are based on macroblocks may include JPEG, where they are called MCU blocks, H.261, MPEG-1 Part 2, H.262/MPEG-2 Part 2, H.263, MPEG-4 Part 2, and H.264/MPEG-4 AVC. After an inter coded frame is divided into macroblocks, instead of and/or in addition to directly encoding raw pixel values for each block, an encoder may identify a block similar to the one it is encoding on another frame, referred to as a reference frame. This process may be performed by a block matching algorithm. If an encoder succeeds on its search for a reference frame, a block may be encoded by a vector, known as motion vector, which points to a position of a matching block at the reference frame. A process of motion vector determination may be referred to as motion estimation. Residual values, based on differences between estimated blocks and blocks they are meant to estimate, may be referred to as a prediction error and may be transformed and sent to a decoder.

Still referring to FIG. 1, using a motion vector pointing to a matched block and/or a prediction error a decoder may reconstruct raw pixels of an encoded block without requiring transmission of the full set of pixels. For example, video may be compressed using a P-frame algorithm and broken down into macroblocks. Individual still images taken from video may then be compared against a reference frame taken from another video or augmented video. A P-frame from video may only hold the changes in image from target video. For example, if both video include a similar image, frame, or other element of a video and/or group of pictures, then what may be encoded and stored may include subtle changes such as an additional character dialogue or character appearances compared to the video without the dialogue. Exemplary video compression codecs may include without limitation H.26x codecs, MPEG formats, VVC, SVT-AV1, and the like. In some cases, compression may be lossy, in which some information may be lost during compression. Alternatively, or additionally, in some cases, compression may be substantially lossless, where substantially no information is lost during compression. In some cases, image component may include a plurality of temporally sequential frames. In some cases, each frame may be encoded (e.g., bitmap or vector-based encoding). Each frame may be configured to be displayed by way of a display.

With continued reference to FIG. 1, memory 104 contains instructions configuring processor 102 to extract one or more content features 124 from a plurality of image frames 108 and associated speech waveform 110. For the purposes of this disclosure, "content features" are measurable attributes, representations, or derived characteristics of raw content 106. In some cases, content features 124 may describe semantic, structural, or perceptual aspects of image frames 108 and/or speech waveform 110. In some cases, content features 124 may include visual features 112 extracted from image frames 108 such as object boundaries, facial landmarks, gesture vectors, motion flow descriptors, or scene classification embeddings. In some cases, content features 124 may include acoustic features 126 derived from speech waveform 110 such as pitch, formants, spectral coefficients, prosodic contours, or text-based elements produced from automatic speech recognition. As a non-limiting example, a content feature 124 may include a detected face bounding box within an image frame 108 that is classified into a speaker identity. As another non-limiting example, a content feature 124 may include sequence of phonemes extracted from speech waveform 110 that is aligned with temporal intervals of corresponding image frames 108. In another non-limiting example, a content feature 124 may include prosodic patterns in the speech waveform 110 and facial expressions in image frames 108, jointly representing affective states such as happiness, frustration, or neutrality. In some cases, processor 102 may retrieve content feature 124 from database 116. In some cases, user may manually determine content feature 124.

With continued reference to FIG. 1, for the purposes of this disclosure, "visual features" are quantitative or structural attributes derived from a plurality of image frames that characterize aspects of the visual content. As a non-limiting example, visual features 112 may include raw pixel intensity values, color histograms, edge maps, gradient orientation histograms, motion vectors derived from optical flow analysis, or embedding representations generated by convolutional neural networks trained to capture spatial and temporal patterns. In some cases, visual features 112 may include geometric descriptors such as facial key points, body pose estimations, or object bounding box coordinates. As a non-limiting example, a visual feature 112 may include histogram of oriented gradients computed from an image frame 108 to characterize edge distributions in a scene. In another non-limiting example, a visual feature 112 may be a set of motion vectors obtained from optical flow analysis across successive image frames 108, describing the movement of a speaker's hand gesture. In another non-limiting example, a visual feature 112 may be a low-dimensional embedding vector produced by passing image patches through a pre-trained vision encoder. As another non-limiting example, visual features 112 may include the bounding box coordinates, texture patterns, and pose key points derived from an image frame 108 that depict a human figure, object, and the like.

With continued reference to FIG. 1, for the purposes of this disclosure, "acoustic features" are quantitative descriptors derived from a speech waveform that represent the spectral, temporal, or prosodic characteristics of speech. As a non-limiting example, acoustic features 126 may include short-term energy, zero-crossing rate, pitch contours, formant frequencies, Mel-frequency cepstral coefficients (MFCCs), spectrogram slices, or embeddings generated by neural acoustic models. In some cases, acoustic features 126 may be extracted from windowed segments of speech waveform 110. In some cases, acoustic features 126 may be used to detect patterns such as filler words 128, speaker-specific traits, or emotion-related variations. As a non-limiting example, an acoustic feature 126 may be the pitch contour extracted from a segment of the speech waveform 110. In another non-limiting example, an acoustic feature 126 may be a sequence of MFCCs generated from overlapping frames of the speech waveform 110. In another non-limiting example, an acoustic feature 126 may be an embedding vector derived from a spectrogram segment processed through a deep learning acoustic encoder.

With continued reference to FIG. 1, in some embodiments, processor 102 may extract one or more content features 124 from a plurality of image frames 108 by applying a computer vision model trained to recognize semantic objects, classify scenes, or generate low-dimensional embeddings that preserve contextual meaning. In some cases, processor 102 may analyze speech waveform 110 using an acoustic modeling engine, which may include feature extraction modules such as Mel-frequency cepstral coefficient computation, spectrogram analysis, or prosody detection. In some cases, processor 102 may employ automatic speech recognition to generate a time-aligned transcript 130 of speech waveform 110, from which lexical tokens or linguistic structures may be identified as additional content features 124. In some cases, extracted content features 124 may then be organized into structured metadata tables in memory 104 or database 116.

With continued reference to FIG. 1, in some embodiments, processor 102 may be configured to analyze raw content 106 using computer vision system to determine content feature 124 (e.g., visual feature 112). For the purposes of this disclosure, a "computer vision system" is a type of technology that enables a computing device to inspect, evaluate and identify still or moving images. In some cases, a computer vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, computer vision system may also be called as machine vision system or machine vision system in this disclosure. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed by comparing the two sets of points, and new x, y, and/or z coordinates, may be iteratively estimated and compared until the error function drops below a threshold level.

With continued reference to FIG. 1, in some cases, a computer vision system may use a classifier, such as any classifier described throughout this disclosure. As a non-limiting example, the computer vision system may use an image classifier. For example and without limitation, the computer vision system may use the image classifier, wherein an input may include image frames 108 that is analyzed to find the content feature 124, and through a classification algorithm, outputs the content feature 124 with a label of the content feature 124 based on image training data. For the purposes of this disclosure, "image training data" is training data that is used to train an image classifier. The image training data disclosed herein may be consistent with any training data disclosed in the entirety of this disclosure. In an embodiment, the image training data may correlate image frames 108 that may be analyzed to find the content feature 124 to the content feature 124 with a label (content identifier 118) of the content feature 124.

With continued reference to FIG. 1, in some cases, processor 102 may be configured to analyze raw content 106 (e.g., image frames 108) using an image processing module. In a non-limiting example, image processing module may perform feature extraction to identify visual features 112. In some embodiments, processor 102 may apply one or more computer vision techniques, including object detection, image segmentation, or pattern recognition, to detect relevant visual features 112. As used in this disclosure, an "image processing module" is one or more distinct image processing technique designed to perform specific processing tasks and or operations to a digital image. For example, and without limitation, image processing module may be configured to compile plurality of digital images to create an integrated image. In an embodiment, image processing module may include a plurality of software algorithms that can analyze, manipulate, or otherwise enhance an image, such as, without limitation, a plurality of image processing techniques as described below. Image processing module may include, without limitation, modules that perform modifications such as random rotation, color jitter, Gaussian blur, perspective transform, shear transform, shadow casting, reflected light, ink color swap, moire, noise texturization, Gaussian noise, salt and pepper noise, folding and creasing, crumpled paper effect, and the like, and described in detail above. In a non-limiting example, image processing module may include any combination of image processing module. In some cases, image processing module may be implemented with one or more image processing libraries such as, without limitation, OpenCV, PIL/Pillow, ImageMagick, and the like. Image processing module may include, be included in, or be communicatively connected to processor 102, and/or memory 104.

With continued reference to FIG. 1, in an embodiment, image processing module may be configured to compress and/or encode images to reduce the file size and storage requirements while maintaining the essential visual information needed for further processing steps as described below. In an embodiment, compression and/or encoding of plurality of images may facilitate faster transmission of images. In some cases, image processing modules may be configured to perform a lossless compression on images, wherein the lossless compression may maintain the original image quality of images. In a nonlimiting example, image processing module may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module may be configured to perform a lossy compression on plurality of images, wherein the lossy compression may sacrifice some image quality of images to achieve higher compression ratios. In a non-limiting example, image processing module may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

With continued reference to FIG. 1, in an embodiment, processing images may include determining a degree of quality of depiction of a region of interest of an image or a plurality of images. In an embodiment, image processing module may determine a degree of blurriness of images. In a non-limiting example, image processing module may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module may be configured to rank images according to degree of quality of depiction of a region of interest and select a highest-ranking image from a plurality of digital images.

With continued reference to FIG. 1, processing images may include enhancing at least a region of interest via a plurality of image processing techniques to improve the quality (or degree of quality of depiction) of an image for better processing and analysis as described further in this disclosure. In an embodiment, image processing module may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module, by averaging or filtering out pixel values in neighborhood of each pixel of an image to reduce random variations.

With continued reference to FIG. 1, in another embodiment, image processing module may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Image processing module may be configured to adjust the brightness and darkness levels within an image to make a feature more distinguishable (i.e., increase degree of quality of depiction). Additionally, or alternatively, image processing module may be configured to perform a brightness normalization operation to correct variations in lighting conditions (i.e., uneven brightness levels). In some cases, an image may include a consistent brightness level across a region after brightness normalization operation performed by image processing module. In a non-limiting example, image processing module may perform a global or local mean normalization, where the average intensity value of an entire image or region of an image may be calculated and used to adjust the brightness levels.

With continued reference to FIG. 1, in other embodiments, image processing module may be configured to perform a color space conversion operation to increase degree of quality of depiction. In a non-limiting example, in case of a color image (i.e., RGB image), image processing module may be configured to convert RGB image to grayscale or HSV color space. Such conversion may emphasize the differences in intensity values between a region or feature of interest and the background. Image processing module may further be configured to perform an image sharpening operation such as, without limitation, unsharp masking, Laplacian sharpening, high-pass filtering, and/or the like. Image processing module may use image sharpening operation to enhance the edges and fine details related to a region or feature of interest within an image by emphasizing high-frequency components within an image.

With continued reference to FIG. 1, processing images may include isolating a region or feature of interest from the rest of an image as a function of plurality of image processing techniques. Images may include highest-ranking image selected by image processing module as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by image processing module to enhance the edges of objects, remove noise, or fill gaps in a region or feature of interest before further processing.

With continued reference to FIG. 1, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

Referring to FIG. 1, in a non-limiting example, identifying one or more visual features 112 from digital image (image frame 108) may include isolating one or more areas of interests using one or more edge detection techniques. An area of interest may include a specific area within a digital image that contains information relevant to further processing, such as one or more image features. In a non-limiting example, image data located outside an area of interest may include irrelevant or extraneous information. Such portion of digital image (image frame 108) containing irrelevant or extraneous information may be disregarded by image processing module, thereby allowing resources to be concentrated at a targeted area of interest. In some cases, the area of interest may vary in size, shape, and/or location within digital image (image frame 108). In a non-limiting example the area of interest may be objects, human, and the like. In some cases, the area of interest may specify one or more coordinates, distances, and the like. Image processing module may then be configured to isolate the area of interest from digital image (image frame 108) based on the particular feature. In a non-limiting example, image processing module may crop an image according to a bounding box around an area of interest.

With continued reference to FIG. 1, image processing module may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module as feature of interest, while other components may be discarded. Image processing module may be further configured to extract feature of interest from an image for further processing. One or more digital image (raw content 106) may be transmitted from processor 102 to image processing module via any suitable electronic communication protocol, including without limitation packet-based protocols such as transfer control protocolinternet protocol (TCP-IP), file transfer protocol (FTP) or the like. Receiving images may include retrieval of digital image (raw content 106) from a data store containing images as described below; for instance, and without limitation, images may be retrieved using a query that specifies a timestamp that images may be required to match.

With continued reference to FIG. 1, in some cases, processor 102 may include audiovisual speech recognition (AVSR) processes to recognize content feature 124 (e.g., acoustic feature 126) in raw content 106. For example, and without limitation, processor 102 may use image frames 108 to aid in recognition of audible verbal content such as viewing user move their lips to speak on video. AVSR may use image frames 108 to aid the overall translation of the audio verbal content of raw content 106. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum (speech waveform 110) and an image datum (image frames 108) to recognize content feature 124. For instance, audio vector and image vector may each be concatenated and used to predict speech made by a user, who is 'on camera.'

With continued reference to FIG. 1, in some embodiments, extracting one or more content features 124 may include generating a transcript 130 of speech waveform 110 using an automatic speech recognition module of speech model 132, wherein the transcript 130 may be time-aligned with a plurality of image frames 108 and extracting the one or more content features 124 from the transcript 130. For the purposes of this disclosure, a "transcript" is a machine-readable textual representation of a speech waveform. As a non-limiting example, transcript may include a sequence of words or sub-word units corresponding to utterances in speech waveform 110 and may include temporal alignment information that associates each word or sub-word unit with a defined temporal interval 134 within the waveform. In some embodiments, transcript 130 may be aligned with a plurality of image frames 108, thereby linking spoken content to corresponding visual content in the video stream. By representing speech as text with temporal markers, transcript 130 enables processor 102 to extract content features 124 such as keywords, semantic topics, or entity mentions, and to synchronize those features with associated video segments for subsequent labeling, filler word removal, supplemental segment insertion, or edit timeline creation.

With continued reference to FIG. 1, in some embodiments, processor 102 may obtain transcript 130 using automatic speech recognition (ASR) module. As a non-limiting example, ASR module may analyze speech waveform 110. For the purposes of this disclosure, "automatic speech recognition module" is a technology that converts spoken language into written text or machine-readable form. In some embodiments, ASR module may include techniques employing language processing to aid speech recognition processes. In some cases, ASR module may be used to decode (i.e., recognize) indeterministic phonemes or help in forming a preponderance among probabilistic candidates. In some cases, ASR module may include an audio-based automatic speech recognition process and an image-based automatic speech recognition process. ASR module may analysis audio according to any method described herein, for instance using a Mel frequency cepstral coefficients (MFCCs) and/or log-Mel spectrogram derived from raw audio samples. In some cases, feature recognition may include any feature recognition process described in this disclosure, for example a variant of a convolutional neural network. For instance, audio vector may each be concatenated and used to predict speech made by user. As a non-limiting example, ASR module may analyze speech waveform 110 by segmenting the waveform into overlapping time windows, extracting acoustic features 126 such as Mel-frequency cepstral coefficients, pitch contours, or spectrogram slices, and mapping the extracted features into phonetic units using an acoustic model.

Still referring to FIG. 1, in some embodiments, automatic speech recognition module may require training (i.e., enrollment). In some cases, training an automatic speech recognition model may require an individual speaker to read text or isolated vocabulary. In some cases, a solicitation video may include an audio component having an audible verbal content, the contents of which are known a priori by processor 102. Processor 102 may then train an automatic speech recognition model according to training data which includes audible verbal content correlated to known content. In this way, processor 102 may analyze a person's specific voice and train an automatic speech recognition model to the person's speech, resulting in increased accuracy. Alternatively or additionally, in some cases, processor 102 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 102 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition module may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments, HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (e.g., speech waveform 110). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (e.g., speech waveform 110) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., audible verbal content) speeds. In some cases, DTW may allow processor 102 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 3-5. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, in some cases, generating transcript 130 of speech waveform 110 may include receiving speech waveform 110 including speech data a plurality of different speakers, generating masked clusters 136 of the speech waveform 110, converting the masked clusters 136 into a time domain to obtain a plurality of separated speech signals 138 corresponding to the plurality of different speakers, extracting one or more acoustic features 126 of one or more content features 124 from a target speech signal and generating a sequence of words from the one or more acoustic features 126 to produce the transcript 130 corresponding to the target speech signal. For the purposes of this disclosure, "speech data" is acoustic information contained within a speech waveform that represents spoken language produced by one or more individuals. Speech data may include a raw audio signal as well as the measurable characteristics embedded in that signal, including amplitude, frequency, spectral composition, temporal patterns, and prosodic variations. In some embodiments, speech data may include phonemes, syllables, words, and pauses that collectively form continuous speech. In other embodiments, speech data may include non-lexical elements such as filler words, hesitations, or background vocalizations, provided they are acoustically represented within the waveform. Speech data may also reflect speaker-specific attributes, such as pitch range, formant structure, and speaking rate, which can be used by processor 102 for speaker differentiation. For the purposes of this disclosure, "speakers" are distinct human or machine sources of speech whose vocal characteristics are present in a speech waveform. For example, and without limitation, in a meeting video, speakers may include Speaker A with a low-pitched voice, Speaker B with a higher-pitched voice, and a synthetic assistant voice. Processor 102 may be configured to recognize that speech waveform 110 includes contributions from these different speakers. For the purposes of this disclosure, "masked clusters" are groups of embeddings in a feature space generated from a speech waveform that have been partitioned and then selectively filtered using binary or soft masks. For example, and without limitation, processor 102 may pass speech waveform 110 through a deep neural network to create spectral embeddings, cluster those embeddings into groups using a k-means algorithm and then apply masks to isolate embeddings associated with each speaker. The masked clusters may therefore represent separated portions of the mixed waveform in the feature space before being reconstructed into waveforms. For the purposes of this disclosure, a "time domain" is a representation of an audio signal in which amplitude is expressed as a function of time. While clustering and masking are performed in a frequency domain representation such as a spectrogram, processor 102 may use an inverse transform, such as an inverse short-time Fourier transform, to convert masked clusters 136 back into time-domain signals that can be directly played back as audio waveforms. For the purposes of this disclosure, "speech signals" are reconstructed, time-domain audio signals corresponding to individual sources extracted from the mixed waveform. For example, and without limitation, after converting masked clusters 136 into a time domain, processor 102 may generate three separate speech signals, one for Speaker A, one for Speaker B, and one for the assistant voice. For the purposes of this disclosure, a "target speech signal" is a separated audio waveform corresponding to a designated target speaker. For the purposes of this disclosure, a "target speaker" is a designated source of speech within a mixed speech waveform. In some cases, target speaker may be one of several speakers present in the audio content. In some cases, target speaker may be identified based on contextual relevance, content identifiers, user input, or automated selection criteria. In some cases, user may manually determine target speaker. Once identified, corresponding separated waveform of that target speaker may be designated as target speech signal. In some cases, processor 102 may first separate a mixed speech waveform into a plurality of individual speech signals, each corresponding to one of different speakers. From these, processor 102 may select a target speech signal that aligns with a target speaker. For example, and without limitation, in a panel discussion video containing multiple voices, processor 102 may identify and isolate the panel moderator's speech as a target speech signal. In another non-limiting example, for a customer support recording, a target speech signal may be selected as a customer's voice.

With continued reference to FIG. 1, in a non-limiting example, processor 102 may pass a mixed speech waveform (speech waveform 110) through a source separation neural network trained to map spectral features into embeddings. The embeddings may be clustered and masked to isolate the contribution of each speaker. The masked clusters 136 may be then reconstructed into a time domain to produce individual speech signals. Processor 102 may select a target speech signal, extract acoustic features 126 such as Mel-frequency cepstral coefficients or prosodic contours, and forward the acoustic features 126 to an automatic speech recognition model. The ASR model may output a sequence of words corresponding to the spoken content of the target speech signal, thereby generating transcript 130 aligned with the original video timeline.

With continued reference to FIG. 1, processor 102 may generate transcript 130 of speech waveform 110 by applying a multi-stage computational pipeline that includes source separation, feature extraction, and speech-to-text conversion. In some embodiments, processor 102 first receives speech waveform 110 including speech from a plurality of different speakers. The mixed speech waveform may be converted into a frequency-domain representation, such as a spectrogram, using a short-time Fourier transform (STFT). The spectrogram encodes amplitude and phase information of the waveform across discrete time windows and frequency bins. Processor 102 may then provide the spectrogram to a deep neural network (DNN) trained on speech source separation tasks. The DNN may generate embeddings for each time-frequency bin, mapping them into a high-dimensional feature space such that embeddings corresponding to the same speaker cluster together. Processor 102 may then apply a clustering algorithm, such as k-means, to partition the embeddings into masked clusters. Each masked cluster represents the contribution of a single speaker's voice across the spectrogram. To reconstruct these signals into audible speech, processor 102 applies binary or soft masks to the spectrogram and then uses an inverse short-time Fourier transform (ISTFT) to convert the masked clusters into the time domain. This step produces a plurality of separated speech signals 138, each of which corresponds to one of the speakers originally present in the mixed speech waveform. For example, and without limitation, if the mixed waveform contained three overlapping voices, the processor may generate three distinct time-domain speech signals, each isolating one speaker's vocal content. From the plurality of separated speech signals, processor 102 selects a target speech signal. Selection criteria may include a priori designation (e.g., identifying the primary lecturer in a classroom recording), dynamic estimation (e.g., selecting the source with the highest energy or longest duration), or user input specifying which speaker should be transcribed. Once the target speech signal is identified, processor 102 may extract acoustic features 126 such as Mel-frequency cepstral coefficients (MFCCs), spectral roll-off, prosodic features (pitch, intonation, rhythm), or learned embeddings from a front-end feature extraction model. These acoustic features 126 may be then input to an automatic speech recognition (ASR) model, which may include recurrent neural networks, attention-based encoder-decoder architectures, or transformer-based architectures. The ASR model may output a sequence of words corresponding to the lexical content of the target speech signal. Processor 102 may align these words with temporal intervals 134 derived from the underlying spectrogram, thereby generating transcript 130, which is time-aligned with both the speech waveform and the plurality of image frames.

With continued reference to FIG. 1, memory 104 contains instructions configuring processor 102 to assign at least a content identifier 118 to at least a portion of raw content 106 as a function of one or more content features 124. For the purposes of this disclosure, a "content identifier" is a data element that associates a segment of the raw content with a structural or semantic marker. In some cases, processor 102 may retrieve content identifier 118 from database 116. In some cases, user may manually determine content identifier 118.

With continued reference to FIG. 1, in some cases, assigning at least a content identifier 118 may include segmenting a speech waveform 110 into a plurality of speaker-specific segments 140 based on a plurality of speech signals 138 and assigning a speaker identifier 142 of the at least a content identifier 118 to each of the plurality of speaker-specific segments 140. As a non-limiting example, a content identifier 118 may be a speaker identifier 142 assigned to a portion of speech waveform 110 corresponding to a particular individual's voice or a portion of image frames 108. For the purposes of this disclosure, a "speaker identifier" is a type of content identifier that designates an association between a portion of the raw content and a particular speaker. In some cases, speaker identifier 142 may be assigned based on analysis of speech waveform 110, image frames 108, or a combination thereof, using extracted content features 124 that reflect speaker-specific characteristics. In some embodiments, processor 102 may generate a speaker identifier 142 by separating speech waveform 110 into distinct acoustic clusters, where each cluster corresponds to a different voice profile. Acoustic features 126 such as pitch, formant frequencies, spectral envelope, and speaking rate may be extracted from these clusters and compared to stored voice embeddings in database 116 to assign consistent identifiers across segments. In some cases, processor 102 may analyze image frames 108 to detect and track facial landmarks or lip movements, thereby associating visual features 112 with a corresponding segment of speech waveform 110. As a non-limiting example, in an interview recording, processor 102 may assign a first speaker identifier 142 to portions of the speech waveform 110 corresponding to the interviewer's voice and image frames 108 depicting the interviewer, while a second speaker identifier 142 is assigned to the interviewee's voice and image frames 108. In another non-limiting example, in a multi-participant conference, processor 102 may assign unique speaker identifiers 142 to each participant, ensuring that segments of speech waveform 110 and associated image frames 108 are consistently attributed to the correct individuals.

With continued reference to FIG. 1, for the purposes of this disclosure, "speaker-specific segments" are portions of a speech waveform that have been partitioned and attributed to a single speaker. In some cases, each speaker-specific segment may be defined by temporal boundaries corresponding to a start time and end time of speech activity attributable to that speaker. As a non-limiting example, speaker-specific segments 140 may include words, phrases, sentences, or longer stretches of dialogue. As a non-limiting example, speaker-specific segments 140 may form the fundamental units for assigning speaker identifiers within a mixed speech waveform. In some cases, processor 102 may generate speaker-specific segments by performing diarization and segmentation operations on the speech waveform 110. In some embodiments, processor 102 may first receive a plurality of separated speech signals 138, each corresponding to a different speaker isolated through source separation techniques. From these signals, processor 102 may compute acoustic features such as Mel-frequency cepstral coefficients (MFCCs), pitch contours, spectral embeddings, or prosodic patterns that uniquely characterize each speaker. Using these features, processor 102 may apply a voice activity detection (VAD) algorithm to identify the temporal regions within each separated signal where speech is present versus silence or background noise. The VAD output yields coarse temporal intervals 134, which are further refined by diarization models. For example, and without limitation, a neural network-based diarization model may generate embeddings (e.g., x-vectors or d-vectors) that capture the vocal characteristics of each speaker. Once temporal intervals 134 are defined, processor 102 may map each segment back to the mixed waveform timeline, ensuring alignment with the original video frames. Processor 102 may assign a unique speaker identifier 142 from the set of content identifiers to each speaker-specific segment. For instance, and without limitation, segments produced by the voice characteristics of Speaker A may be labeled with a first identifier, while segments from Speaker B may be labeled with a second identifier. In some embodiments, processor 102 may refine speaker-specific segments 140 by merging consecutive intervals assigned to the same speaker, splitting segments where speaker overlap occurs, or dynamically updating boundaries as more data is processed. As a non-limiting example, in a panel discussion video containing five participants, processor 102 may segment the waveform into alternating intervals of speech and silence, assign a distinct speaker identifier to each participant's intervals, and align these labeled segments with corresponding video frames showing the active speaker.

With continued reference to FIG. 1, in some cases, assigning at least a content identifier 118 may include extracting one or more visual features 112 of one or more content features 124 from a plurality of image frames 108 using a computer vision module, generating an embedding representation of the one or more visual features 112, classifying the embedding representation into one or more scene categories and assigning a scene identifier of the at least a content identifier 118 corresponding to the one or more scene categories to at least a portion of raw content 106. In another non-limiting example, a content identifier 118 may be a scene identifier assigned to a group of image frames 108. For the purposes of this disclosure, a "scene identifier" is a type of content identifier that designates an association between a portion of raw content and a scene category. In some embodiments, processor 102 may generate a scene identifier by first extracting visual features 112 such as color histograms, edge descriptors, motion vectors, or embedding representations computed by a computer vision model. These visual features 112 may then be processed to form an embedding representation, which can be compared against reference embeddings stored in database 116 or evaluated by a trained classifier. Based on the similarity or classification output, processor 102 may assign a scene identifier corresponding to a scene category. As a non-limiting example, processor 102 may assign the scene identifier "office" when visual features 112 extracted from image frames 108 include edges and textures consistent with furniture and indoor lighting patterns. In another non-limiting example, processor 102 may assign the scene identifier "outdoor" when the visual features 112 include high-luminance regions, natural textures, and motion vectors associated with environmental elements such as trees or moving vehicles. In another non-limiting example, processor 102 may assign the scene identifier "classroom" when the visual features 112 reveal repetitive seating arrangements, a whiteboard, and a detected presenter at the front of the room. In some cases, assignment may be performed by classifying embeddings of visual features 112 into scene categories such as "indoor," "outdoor," or "office environment."

With continued reference to FIG. 1, for the purposes of this disclosure, an "embedding representation" is a vector or data structure that encodes one or more features extracted from an input into a compact and semantically meaningful format. In some cases, embedding representation may preserve high-level semantic relationships between inputs, such that visually or contextually similar frames are mapped to points that are close together in the embedding space, while dissimilar frames are mapped farther apart. For example, and without limitation, image frames 108 depicting an indoor office and image frames 108 depicting a conference room may have embedding representations located closer to one another than image frames 108 depicting a mountain landscape. For the purposes of this disclosure, "scene categories" are labels representing semantic classifications of a visual environment or context identified within a plurality of image frames. Scene categories may include, as non-limiting examples, "indoor," "outdoor," "office," "kitchen," "city street," "forest," "beach," "mountain," "classroom," "laboratory," "retail store," or "sports stadium." Scene categories may be hierarchical, such that a broad label like "indoor" can include more specific categories such as "office" or "kitchen." In some cases, processor 102 may receive a plurality of image frames 108 from raw content 106. Using a computer vision module, processor 102 may extract visual features 112 from these image frames 108. Such visual features 112 may include low-level features like color histograms, edge maps, and texture descriptors, as well as high-level features like detected objects, spatial layouts, and motion cues. Once visual features are extracted, processor 102 may generate an embedding representation by passing visual features 112 through a trained deep learning model, such as a convolutional neural network (CNN), vision transformer (ViT), or hybrid architecture. This model may map visual features 112 into a fixed-length vector embedding that captures the semantic essence of the scene depicted in the image frames 108. Processor 102 may then perform classification on the embedding representation by comparing it against reference embeddings or by feeding it into a classifier trained on a labeled dataset of scene categories. The classification may produce a probability distribution across multiple scene categories, allowing the processor 102 to determine the most likely labels for the current sequence of frames. For example, and without limitation, if the embedding representation has high similarity to embeddings labeled as "office," processor 102 assigns the "office" scene identifier as the content identifier 118. The scene identifier may be then aligned with the temporal interval 134 of the image frames 108 in which the scene is detected. In some embodiments, processor 102 may assign multiple scene categories simultaneously if the embedding representation indicates a composite context (e.g., "restaurant indoor" and "crowded").

With continued reference to FIG. 1, in another non-limiting example, a content identifier 118 may include an emotion identifier. In some cases, assigning at least a content identifier 118 may include generating an embedding representation of the one or more content features 124, classifying the embedding representation into one or more emotion categories and assigning an emotion identifier of the at least a content identifier 118 corresponding to the one or more emotion categories to at least a portion of raw content 106. As a non-limiting example, emotion identifier may include "neutral," "happy," or "frustrated." For the purposes of this disclosure, an "emotion identifier" is a type of content identifier that designates an affective or emotional state associated with at least a portion of the raw content. In some embodiments, processor 102 may generate an emotion identifier by computing acoustic features 126 such as pitch variability, spectral energy distribution, speech rate, or prosodic contours from speech waveform 110, in combination with visual features 112 such as facial key points, eye gaze, or gesture dynamics extracted from image frames 108. These multimodal features may then be embedded into a joint representation space and classified using a trained emotion recognition model to yield an interpretable label. As a non-limiting example, processor 102 may assign the emotion identifier "happy" when the acoustic features 126 indicate elevated pitch and faster speech rate, while the visual features 112 indicate upward mouth curvature consistent with smiling. In another non-limiting example, processor 102 may assign emotion identifier "neutral" when acoustic features 126 show steady prosody and low variability in pitch, and the visual features 112 depict minimal facial expression changes. In another non-limiting example, processor 102 may assign emotion identifier "frustrated" when the acoustic features 126 include elongated pauses and stressed intonation, while the visual features 112 show furrowed brows or abrupt gestures.

With continued reference to FIG. 1, for the purposes of this disclosure, "emotion categories" are a set of data that represent emotional tone or sentiment of a speaker, a scene, or other audiovisual content. As a non-limiting example, emotion categories may include happiness, sadness, anger, fear, surprise, disgust, and neutrality. In some embodiments, emotion categories may be expanded into more granular states such as excitement, frustration, boredom, confusion, calmness, or empathy. In some cases, emotion categories may be organized hierarchically, such that a general category like "positive" encompasses specific subcategories like "happiness" and "excitement." In some cases, processor 102 may receive one or more content features 124 derived from raw content 106, which may include acoustic features from the speech waveform (e.g., pitch, tone, energy, spectral properties), visual features from the plurality of image frames (e.g., facial landmarks, micro-expressions, posture, gestures), and textual features from transcript 130 (e.g., sentiment-laden words or phrases). In some cases, processor 102 may generate an embedding representation of these features. For acoustic inputs, a speech emotion recognition model may map prosodic and spectral features into a latent embedding space. For visual inputs, a computer vision model such as a convolutional neural network (CNN) or vision transformer (ViT) trained on facial expression datasets may generate embeddings of facial landmarks or action units. For textual inputs, a natural language processing (NLP) model such as BERT or GPT embeddings may capture semantic and affective meaning from the transcript. In some embodiments, processor 102 may fuse embeddings from multiple modalities into a unified multimodal embedding representation. Once the embedding representation is generated, processor 102 may classify it into one or more emotion categories. This may be accomplished by applying a classifier trained on labeled emotional data, such as a softmax output layer producing probabilities across the set of categories. For example, and without limitation, processor 102 may classify an embedding as 80% "happiness," 15% "surprise," and 5% "neutrality," assigning "happiness" as the primary emotion identifier. In cases of mixed emotions, processor 102 may assign multiple identifiers or weight them proportionally. In some cases, emotion identifier may be associated with a corresponding temporal interval 134 of the raw content. These identifiers may then inform downstream editing operations, such as overlaying a supplemental segment that reinforces the detected emotion, adjusting background music to match the mood, or tagging portions of the video for analytics.

With continued reference to FIG. 1, in some embodiments, processor 102 may assign a content identifier 118 by first generating an embedding representation of the extracted content features 124. This embedding representation may be produced through dimensionality reduction, clustering, or the forward pass of a trained neural network, such that the embedding captures statistical or contextual relationships among the features. Processor 102 may then compare the embedding representation against reference models, trained classifiers, or stored exemplar embeddings within memory 104. When a sufficient similarity or match is detected, the processor 102 may assign the corresponding content identifier 118 to the relevant portion of the raw content 106. For instance, when acoustic features are clustered into speaker-specific patterns, the processor 102 may assign unique speaker identifiers to different segments of the speech waveform 110. When visual features are classified into discrete scene categories, the processor 102 may assign scene identifiers to contiguous groups of image frames 108. When emotion-specific embeddings are matched to affective state models, the processor 102 may assign emotion identifiers to temporally aligned portions of both the image frames 108 and the speech waveform 110.

With continued reference to FIG. 1, in some cases, assigning content identifier 118 may include identifying a shape of a content feature 124 by classifying the shape of the content feature 124 to a label (content identifier 118) of the content feature 124 using an image classifier; the image classifier may be trained using a plurality of images of content features 124. The content identifier 118 disclosed herein is further described in detail below. The image classifier may be configured to determine which of a plurality of edge-detected shapes is closest to an attribute set of the content feature 124 as determined by training using training data and selecting the determined shape as the content feature 124. As a non-limiting example, the image classifier may be trained with image training data that correlates the plurality of images of content features 124 to one or more content identifiers 118. The image classifier and the image training data disclosed herein are described further below. Alternatively, identification of the content feature 124 may be performed without using computer vision and/or classification; for instance, identifying the content feature 124 may further include receiving, from a user, an identification of the content feature 124 in an image frame 108.

With continued reference to FIG. 1, memory 104 contains instructions configuring processor 102 to modify speech waveform 110 to generate a modified waveform 144 using a speech model 132. For the purposes of this disclosure, a "modified waveform" is an audio signal derived from an original speech waveform after one or more processing operations. In some cases, modified waveform 144 may retain intelligibility and continuity of speech waveform 110 while removing, suppressing, or adjusting undesired elements such as filler words 128, noise artifacts, or temporal gaps. In some cases, user may manually modify speech waveform 110 to generate a modified waveform 144.

With continued reference to FIG. 1, generating modified waveform 144 includes detecting one or more filler words 128 from speech waveform 110 and removing the one or more filler words 128 from the speech waveform 110. For the purposes of this disclosure, "filler words" are non-lexical or semantically redundant vocalizations. As a non-limiting example, filler words 128 may include utterances such as "um," "uh," "er," "ah," and "hmm." As another non-limiting example, filler words 128 may include discourse markers such as "like," "you know," or "I mean" when used repetitively without semantic intent. In some contexts, filler words 128 may include elongated pauses or non-verbal vocalizations such as throat clearing or lip smacks that interrupt the continuity of speech waveform 110. In some embodiments, acoustic features 126 may be compared against trained acoustic models or embedding representations that characterize the distinctive spectral and temporal patterns of filler words 128. In some cases, processor 102 may employ automatic speech recognition to produce a transcript 130 of speech waveform 110, in which suspected filler tokens may be identified based on their lexical content and alignment with the acoustic features. By cross-referencing the acoustic detection with transcript 130, processor 102 may confirm the presence and temporal intervals 134 of filler words 128 within speech waveform 110.

With continued reference to FIG. 1, in some cases, detecting one or more filler words 128 may include distinguishing the one or more filler words 128 from speech waveform 110 based on a frequency difference in one or more acoustic features 126. In some cases, processor 102 may convert speech waveform 110 into a frequency-domain representation using a short-time Fourier transform (STFT) or a similar method such as a wavelet transform. This operation may produce a spectrogram that represents how the energy of the speech signal is distributed across frequency bands over time. From the spectrogram, processor 102 may extract acoustic features 126 such as Mel-frequency cepstral coefficients (MFCCs), linear predictive coding (LPC) coefficients, formant frequencies, or pitch-related features. These acoustic features 126 may capture the spectral composition of the signal across different frequency ranges. Filler words like "um," "uh," or "ahh" may be characterized by energy concentration in lower frequency bands with limited harmonic content or transitions in higher frequency ranges. By contrast, lexical speech exhibits more complex spectral activity, with distinguishable formant shifts across difference frequencies, as well as significant energy in mid- and high-frequency bands corresponding to consonant bursts, fricatives, or rapid articulatory transitions. In some cases, processor 102 may distinguish filler words 128 by calculating frequency differences across these acoustic features 126. For example, and without limitation, processor 102 may compare the relative energy distribution between low-frequency bands (below 500 Hz) and mid/high-frequency bands (above 1500 Hz). If the energy is disproportionately concentrated in the low-frequency range with minimal variation in higher bands, processor 102 may classify the interval as a filler word 128. In some cases, processor 102 may track changes in formant frequencies over time, steady, flat formant frequencies are indicative of filler utterances while shifting or dynamic formant transitions indicate lexical content. In some embodiments, processor 102 may compute delta features, such as the rate of change of MFCC coefficients across adjacent frames, to quantify frequency differences. Low delta values may suggest prolonged steady-state sounds typical of fillers, whereas high delta values indicate the rapid frequency changes characteristic of spoken words. In some cases, processor 102 may employ a supervised classification model trained on labeled datasets of filler versus non-filler speech. The model may learn to associate patterns of frequency differences (e.g., low spectral variance, concentrated low-frequency energy) with filler words and classify segments accordingly. Once filler words are distinguished, processor 102 may mark the temporal intervals 134 of those filler words 128 in the speech waveform 110, enabling downstream steps such as removal, suppression, or replacement.

With continued reference to FIG. 1, for the purposes of this disclosure, a "speech model" is a computational model that is configured to analyze, transform, or generate representations of the speech waveform. In some cases, speech model 132 may be implemented as a statistical model, a machine learning model, or a deep neural network trained on speech data to capture the acoustic, phonetic, prosodic, or linguistic properties of human speech. In some cases, speech model 132 may operate on acoustic features 126 extracted from speech waveform 110 and produce outputs that may include filler word detection, speech enhancement, transcription, or resynthesized audio signals. In some embodiments, speech model 132 may include an acoustic model trained to map short-term spectral features such as Mel-frequency cepstral coefficients or spectrogram segments to phonetic units, enabling identification of specific sound patterns including filler words 128. In other embodiments, speech model 132 may include a sequence-to-sequence neural network or transformer-based architecture capable of aligning acoustic features with text tokens, thereby facilitating accurate recognition and localization of words within speech waveform 110. In some cases, speech model 132 may incorporate prosodic analysis modules that detect pauses, pitch variations, and energy contours, which can be used to further refine filler word detection and removal. As a non-limiting example, speech model 132 may be a convolutional recurrent neural network (CNN) trained on large corpora of conversational speech to distinguish filler words such as "um" or "uh" from meaningful lexical units. In another non-limiting example, speech model 132 may be a transformer-based end-to-end automatic speech recognition system that simultaneously produces a transcript 130 of speech waveform 110 and aligns timecodes for each token, enabling precise excision of filler words non-limiting. In another non-limiting example, speech model 132 may include a generative speech synthesis component, which reconstructs or smooths the modified speech waveform 110 after filler word removal to maintain natural rhythm and intelligibility.

With continued reference to FIG. 1, in some cases, speech model 132 may include language processing module. In some embodiments, processor 102 may use a language processing module to find a keyword from transcript 130. The language processing module may be configured to extract, from transcript 130, one or more words. One or more words may include filler words 128. One or more words may include, without limitation, strings of one or more characters, including without limitation any sequence or sequences of letters, numbers, spaces, whitespace, and other symbols, including any symbols usable as textual data as described above. Textual data (e.g., transcript 130) may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams," where all sequences of n consecutive characters are considered. Any or all possible sequences of tokens or words may be stored as "chains," for example for use as a Markov chain or Hidden Markov Model.

With continued reference to FIG. 1, language processing module may operate to produce a language processing model. Language processing model may include a program automatically generated by processor 102 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module may then use such associations to analyze words extracted from one or more documents and determine that the one or more documents indicate significance of a category. In an embodiment, language module and/or processor 102 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 102. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 102 may automatically obtain the document using such an identifier, for instance by submitting a request to a database or compendium of documents such as JSTOR as provided by Ithaka Harbors, Inc. of New York.

With continued reference to FIG. 1, in some cases, modifying speech waveform 110 may include identifying temporal intervals 134 within the speech waveform 110 corresponding to one or more filler words 128, removing the temporal intervals 134 from the speech waveform 110 to generate modified waveform 144 and modifying a plurality of image frames 108 to temporally align with the modified waveform 144. The temporal intervals 134 are described in detail below. In some cases, processor 102 may convert speech waveform 110 into a time-frequency representation using a short-time Fourier transform, computing frame-wise acoustic descriptors such as Mel-frequency cepstral coefficients, spectral centroid, spectral flatness, formant trajectories, pitch contours, and energy envelopes. Using these features, processor 102 may classify contiguous frame ranges as filler or non-filler by applying a trained sequence model or rule-based discrimination grounded in spectral differences and frequency differences that are characteristic of filler utterances. The output of this stage is a set of temporal intervals 134, each defined by a start timestamp and an end timestamp in the waveform's time base, that bound the detected filler words 128. Once the temporal intervals 134 are identified, processor 102 may generate modified waveform 144 by removing those intervals from the speech waveform 110 and stitching adjacent non-filler regions. To minimize perceptual artifacts at the cut points, processor 102 may apply cross-fade windows around the splice boundaries, align zero-crossings to avoid discontinuities, and preserve phase continuity by operating in the frequency domain with overlap-add reconstruction. In some embodiments, processor 102 may apply a phase-vocoder or WSOLA/time-domain PSOLA refinement to locally time-compress the neighboring regions so that prosodic rhythm remains natural after excision. Where the filler intervals include background noise or breaths that extend beyond the classified region, the processor 102 may extend the cut boundaries slightly based on energy thresholds or spectral leakage estimates to avoid audible remnants. The result is modified waveform 144 that omits filler content while maintaining intelligibility, prosodic flow, and consistent loudness; loudness normalization and spectral equalization may be applied post-edit to match pre- and post-cut segments. Following audio modification, processor 102 may modify the plurality of image frames 108 to temporally align with modified waveform 144 so that lip movements, speaker actions, and visual pacing remain coherent. Processor 102 may compute the mapping between the original audio time base and the edited audio time base by constructing a monotonic, piecewise-linear time-warp function that removes the excised temporal intervals 134. Using this mapping, processor 102 may re-index presentation timestamps of the image frames and adjust the edit timeline such that frames corresponding to removed audio intervals are either dropped, time-compressed, or bridged with visual transitions. In a simple cut scenario, frames whose timestamps lie strictly within a removed audio interval are omitted, and the preceding and following frames are butted together with an optional video cross-dissolve to conceal the jump cut. In cases where the visual discontinuity would be objectionable, processor 102 may synthesize in-between frames using motion-compensated interpolation driven by optical flow or may apply a brief cutaway on a secondary track, such as an inserted supplemental segment 120, to mask the temporal elision while preserving narrative continuity.

With continued reference to FIG. 1, memory 104 contains instructions configuring processor 102 to generate at least a supplemental segment 120 that is contextually matched to at least a content identifier 118 using a generative model 146. For the purposes of this disclosure, a "supplemental segment" is an additional segment of content that is not part of an originally recorded raw content but is instead created, adapted, or retrieved for integration into the raw content. As a non-limiting example, supplemental segment 120 may include video, audio, image, or multimodal data. As a non-limiting example, a supplemental segment 120 may include a generated video clip depicting a natural background scene, such as a city skyline or classroom environment, inserted during a pause in the raw content 106 to improve visual flow. In another non-limiting example, a supplemental segment 120 may be an audio clip synthesized to provide room tone or ambient noise. In another non-limiting example, a supplemental segment 120 may be a generated image frame sequence depicting a transition effect that visually separates two distinct segments of raw content 106 after filler words or redundant material have been removed. In some cases, processor 102 may generate supplemental segment 120 as a function of content identifier 118 and/or content features 124.

With continued reference to FIG. 1, for the purposes of this disclosure, a "generative model" is a computational model that is configured to synthesize, reconstruct, or adapt new data segments. As a non-limiting example, generative model 146 may include generative adversarial networks (GANs), variational autoencoders (VAEs), diffusion models, or transformer-based architectures, each of which can produce supplemental content that is statistically or semantically consistent with the raw content 106. In some embodiments, the generative model 146 may be trained on large datasets of video and audio to learn mappings between content identifier 118 and/or content features 124 and corresponding synthetic outputs. In some cases, processor 102 may retrieve supplemental segment 120 from database 116. In some cases, user may manually determine supplemental segment 120.

With continued reference to FIG. 1, in some cases, processor 102 may generate supplemental segment 120 by first computing embedding representation of relevant content identifier 118 and/or content features 124, such as visual embeddings from image frames 108 or acoustic embeddings from speech waveform 110. These embeddings may serve as conditioning inputs to generative model 146, which produces new data that aligns temporally or contextually with raw content 106. For instance, and without limitation, generative model 146 may generate a sequence of synthetic video frames matching the lighting and texture properties extracted from nearby image frames 108. For instance, and without limitation, generative model 146 may synthesize audio consistent with the spectral envelope of the surrounding speech waveform 110. Once generated, supplemental segment 120 may be inserted into raw content 106 at a time-aligned position, and metadata may be updated in unified edit timeline 122 to reflect the presence of the supplemental segment 120.

With continued reference to FIG. 1, in some embodiments, generative models 146 may determine patterns and structures from training data and use these patterns to synthesize new data of the same modality or across modalities, including without limitation images, video, audio, or text. Generative models 146 may learn a joint probability distribution over observed variables and target variables, enabling them to produce outputs that resemble training data without being exact replicas. As a non-limiting example, generative models 146 trained on sets of image frames may be configured to produce new frames that maintain consistency with lighting, textures, or motions of the raw content 106. In another non-limiting example, generative models 146 trained on speech waveforms may generate supplemental audio that matches the prosody, tone, or ambient qualities of the original recording. In some cases, generative model 146 may include a generative adversarial network (GAN). As used in this disclosure, a GAN is a machine learning framework comprising two adversarial networks: a generator and a discriminator. The generator creates candidate data samples, while the discriminator evaluates whether these samples appear to originate from the training data distribution. Over iterative training, the generator learns to produce increasingly realistic synthetic outputs that "fool" the discriminator, thereby approaching the statistical properties of true data. When used for video generation, the generator may be implemented as a deconvolutional neural network configured to map latent vectors to image frame sequences, while the discriminator may be implemented as a convolutional neural network configured to distinguish synthetic image frames from real ones.

With continued reference to FIG. 1, in other embodiments, generative model 146 may include a variational autoencoder (VAE). A VAE is an artificial neural network architecture that encodes input data into a structured latent space and decodes from this latent space to reconstruct outputs. By regularizing the latent space during training, a VAE enables the generation of new, coherent data samples by sampling from that space. For example, a VAE trained on video data may generate supplemental segments 120 by sampling from latent representations that capture scene continuity or motion patterns.

With continued reference to FIG. 1, additionally, or alternatively, generative models 146 may include probabilistic models such as Naïve Bayes classifiers, which, while often applied for classification, may also be used as generative models by modeling the joint probability distribution of features and classes and sampling new instances from this distribution. For instance, and without limitation, embeddings derived from image frames 108 may condition a GAN to produce a new sequence of frames that visually match the style and context of the raw content 106. For instance, and without limitation, acoustic features 126 extracted from the speech waveform 110 may condition a VAE to generate background audio consistent with the ambient environment of the raw content 106.

With continued reference to FIG. 1, in some cases, generating at least a supplemental segment 120 may include selecting the at least a supplemental segment 120 using a generative adversarial network (GAN) of generative model 146 by comparing one or more content features 124 with a plurality of stored video segments 148 and inserting the at least a supplemental segment 120 into raw content 106 at a position aligned with the one or more content features 124. For the purposes of this disclosure, "stored video segments" are pre-existing audiovisual clips maintained in a storage medium. In some cases, stored video segment 148 may include a plurality of image frames, an associated audio track, and metadata including but not limited to textual tags, embedding representations, scene identifiers, object identifiers, or emotion identifiers. Examples of stored video segments 148 may include a short clip of a city street tagged as "urban/outdoor," a clip of a conference room tagged as "office/indoor," or a close-up of a person nodding tagged with an "agreement" emotion identifier. In some cases, stored video segments 148 may be stored and retrieved from a local memory, database 116, or cloud repository.

With continued reference to FIG. 1, in some cases, processor 102 may retrieve metadata and embeddings associated with the plurality of stored video segments 148 and perform a similarity comparison between content features 124 of raw content 106 and the indexed features of stored video segments 148. This may be implemented using distance metrics such as cosine similarity, Euclidean distance, or more advanced nearest-neighbor retrieval methods in the embedding space. For example, and without limitation, if transcript 130 contains the word "restaurant," and visual features include "indoor" and "table," processor 102 may compute similarity scores against stored video segments tagged with "restaurant interior" and select the highest-scoring segment as the supplemental segment 120. Once at least a supplemental segment 120 is selected, processor 102 determines temporal interval 134 in the raw content 106 where the supplemental segment should be inserted. This alignment may be based on the location of the detected content feature. For example, and without limitation, if a speaker utters "the market was crowded" at time $t_0$-$t_1$, and the transcript is tagged with "marketplace," processor 102 may insert a stored video segment of a busy marketplace into the raw content aligned to that time interval.

With continued reference to FIG. 1, generating at least a supplemental segment includes inserting the at least a supplemental segment 120 into a plurality of image frames 108 at a position aligned with at least a content identifier 118. In some cases, processor 102 may insert supplemental segment 120 into image frames 108 and/or speech waveform 110 or modified waveform 144 as a function of content identifier 118 and/or content features 124. In some cases, supplemental segment may be integrated into raw content 106 at a temporal and spatial location that corresponds to identified content. For example, and without limitation, where content identifier 118 indicates that a "city street" scene has begun, supplemental segment 120 may be inserted at the onset of the corresponding image frames 108 so that the additional footage visually reinforces the identified context. In some cases, processor 102 may insert supplemental segment 120 into both image frames 108 and associated speech waveform 110 or modified waveform 144 as a function of content identifier 118 and/or content features 124. For example, and without limitation, if content identifier 118 corresponds to a speaker identifier, supplemental segment 120 may be inserted as an overlay adjacent to the frames depicting the active speaker, while the associated audio may be modified to include a supplemental voice marker or auditory cue. Alternatively, if content identifier 118 corresponds to an emotion label, supplemental segment 120 may be inserted into image frames 108 as a stylistic visual effect and the audio track may be processed to include a tonal enhancement aligned with the identified emotion. In some cases, insertion process may be performed by allocating supplemental segment 120 into a secondary track of a unified edit timeline 122 that runs in parallel with image frames 108 and modified waveform 144. Processor 102 may then synchronize supplemental segment 120 with the temporal interval 134 defined by content identifier 118. Transition effects such as fades, wipes, or dissolves may be applied to blend supplemental segment 120 with the surrounding frames, while audio crossfading or waveform adjustments may be applied to maintain continuity in modified waveform 144.

With continued reference to FIG. 1, in some embodiments, processor 102 may perform this operation by first identifying a temporal interval 134 within raw content 106 that corresponds to one or more extracted content features 124. As a non-limiting example, content features 124 may include visual embeddings derived from image frames 108, acoustic embeddings derived from speech waveform 110, or multimodal feature representations aligned across both modalities. In some cases, processor 102 may use these content features 124 to compute a temporal index or frame location within a plurality of image frames 108, thereby determining where a supplemental segment 120 may be placed.

With continued reference to FIG. 1, for the purposes of this disclosure, a "temporal interval 134" is a bounded duration within an audio waveform or a plurality of image frames. In some cases, temporal interval 134 may be defined by a start time and an end time relative to the overall timeline of speech waveform 110 or a plurality of image frames 108. A temporal interval 134 may correspond to any portion of raw content 106 that can be localized in time. In the case of speech, a temporal interval 134 may represent the duration of a phoneme, a word, a filler utterance such as "umm," or an entire speaker segment. In the case of video, a temporal interval 134 may represent the span of image frames 108 depicting a particular scene, event, or content feature. By identifying temporal intervals 134, a processor 102 may selectively manipulate portions of the signal, such as removing filler words from audio, inserting supplemental segments into video, or aligning edits between audio and visual tracks. In some cases, processor 102 may map supplemental segment 120 to a position within image frame sequence by aligning timestamps. For example, and without limitation, when content features 124 correspond to a pause or filler-word removal in speech waveform 110, processor 102 may identify the precise time interval (temporal interval 134) of the removed segment, compute its corresponding frame indices, and assign supplemental segment 120 to this location. In some cases, processor 102 may generate or retrieve a supplemental segment 120 with an inherent duration that matches or is scaled to the temporal length of the identified interval, thereby ensuring continuity within unified edit timeline 122.

With continued reference to FIG. 1, in some embodiments, processor 102 may perform spatial or stylistic adjustments to supplemental segment 120 before insertion. For instance, and without limitation, if supplemental segment 120 is generated by a generative model 146 as a sequence of synthetic image frames, processor 102 may adjust frame resolution, aspect ratio, or color balance so that the supplemental segment 120 visually matches the surrounding raw content 106. For instance, and without limitation, when inserting a supplemental audio segment aligned with acoustic content features 124, processor 102 may apply spectral shaping or volume normalization to ensure smooth blending with adjacent portions of speech waveform 110. As a non-limiting example, when a filler word such as "um" is removed from the speech waveform 110, processor 102 may identify the corresponding two to three frames of the speaker's paused expression in the image frames 108. The supplemental segment 120, such as a synthetic B-roll image frame sequence showing a neutral background, may then be inserted into the identified location to maintain fluidity of playback. In another non-limiting example, processor 102 may detect content features 124 corresponding to a scene transition, generate a supplemental transition sequence using a generative model 146, and insert this supplemental segment 120 between two sets of image frames 108.

With continued reference to FIG. 1, memory 104 contains instructions configuring processor 102 to create a unified edit timeline 122 including at least a content identifier 118, modified waveform 144, and at least a supplemental segment 120. For the purposes of this disclosure, a "unified edit timeline" is a data structure that organizes, synchronizes, and references heterogeneous media elements in a coordinated temporal framework. In some cases, processor 102 may create unified edit timeline 122 by first associating each content identifier 118 with a corresponding temporal interval 134 within raw content 106. The processor 102 may then link modified waveform 144 to the same temporal interval 134 by aligning the waveform data with frame-level timestamps. Supplemental segments 120 may be inserted into unified edit timeline 122 as secondary tracks, overlays, or replacement clips, each entry including metadata specifying temporal location, duration, spatial alignment, and transition effects. In some cases, processor 102 may ensure that all elements within unified edit timeline 122 are synchronized such that the content identifiers act as anchor points, defining where labels, modified audio, and supplemental video segments are placed.

With continued reference to FIG. 1, in some embodiments, processor 102 may maintain unified edit timeline 122 as a hierarchical structure including multiple tracks 150. For the purposes of this disclosure, a "track" is a logical layer within a unified editing timeline that organizes a sequence of time-aligned media elements or transformation instructions. In some cases, each track 150 may represent a continuous or discontinuous arrangement of media data across temporal intervals 134. In some cases, multiple tracks may be composited, synchronized, or overlaid to generate a unified audiovisual output. In some cases, track may include references to media assets, metadata defining their temporal positions, and transformation parameters governing how those assets are rendered. In some cases, track XX may include primary track. For the purposes of this disclosure, a "primary track" is a timeline track that contains the base sequence of audiovisual content forming the core structure of raw content. In some embodiments, primary track may correspond to original or modified image frames and speech waveform 110 or modified waveform 144. In some cases, track XX may include one or more secondary tracks. For the purposes of this disclosure, a "secondary track" is a timeline track that contains additional or supplemental media elements that are aligned with a primary track. As a non-limiting example, secondary track may include supplemental segments 120 such as B-roll, overlays, graphics, animations, or audio enhancements. In a non-limiting example, secondary tracks may be used to augment, replace, or overlay portions of the primary track and may include associated transition instructions, blending parameters, or compositing metadata to ensure continuity with the primary content. As a non-limiting example, primary track may include original or modified image frames 108, a synchronized audio track may include modified waveform 144, and one or more secondary tracks may include supplemental segments 120 or overlays. Metadata fields associated with the tracks may store transformation parameters such as scaling, cropping, color correction, or audio level adjustments.

With continued reference to FIG. 1, in some cases, creating unified edit timeline 122 may include segmenting raw content 106 into a plurality of discrete units as a function of at least a content identifier 118, modified speech waveform 110, and at least a supplemental segment 120 and assigning the plurality of discrete units to one or more tracks 150 within a timeline structure of the unified edit timeline 122. For the purposes of this disclosure, "discrete units" are bounded portions of audiovisual content that have been segmented from raw content based on structural or semantic cues. As a non-limiting example, discrete unit may represent a sequence of contiguous image frames, an aligned portion of a speech waveform, a supplemental segment, or a labeled content interval associated with a content identifier 118 such as a scene, speaker, or emotion. Each discrete unit may carry metadata including start and end times, associated identifiers, and references to transformation parameters such as transitions, overlays, or effects. For example, and without limitation, a discrete unit may correspond to a thirty-second "office scene," a five-second supplemental B-roll clip of a city street, or an audio interval of a target speaker's utterance with filler words removed. For the purposes of this disclosure, a "timeline structure" is a non-linear, multi-track data structure within a unified edit timeline that organizes discrete units in temporal order and spatial alignment. In some cases, timeline structure may include at least a primary track, which carries the backbone of the video and audio content, and one or more secondary tracks, which contain supplemental or overlay content. Each track within the timeline structure may be represented as a horizontal band divided into temporal intervals 134, with each interval occupied by one or more discrete units. Transitions, transformations, and metadata are stored as additional properties of the discrete units within the timeline structure.

With continued reference to FIG. 1, in some cases, processor 102 may segment raw content 106 by identifying boundaries in a video and audio streams that correspond to content identifiers 118 such as scene changes, speaker turns, or emotion transitions. For example, and without limitation, if content identifier 118 indicates a scene change from "office" to "outdoor," processor 102 may mark the transition frame as the boundary between two discrete units. For example, and without limitation, if filler words have been removed from modified speech waveform 110, processor 102 may segment the audio at the excised temporal intervals 134, creating discrete audio units aligned with the edited waveform. Supplemental segments 120, whether selected from stored video or generated by a model, may be packaged as discrete units with temporal metadata defining their intended placement. Once a plurality of discrete units is created, processor 102 may assign each unit to one or more tracks 150 within the timeline structure. Processor 102 may then generate a unified edit timeline 122 that arranges these tracks in a coherent temporal sequence.

With continued reference to FIG. 1, memory 104 contains instructions configuring processor 102 to generate a user interface 152 including unified edit timeline 122. In some embodiments, at least a processor 102 may be configured to generate a user interface 152 displaying unified edit timeline 122. For the purposes of this disclosure, a "user interface" is a means by which a user and a computer system interact. For example through the use of input devices and software. A user interface 152 may include a graphical user interface (GUI), command line interface (CLI), menu-driven user interface, touch user interface, voice user interface (VUI), form-based user interface, any combination thereof and the like. In some embodiments, user interface 152 may operate on and/or be communicatively connected to a decentralized platform, metaverse, and/or a decentralized exchange platform associated with the user. For example, a user may interact with user interface 152 in virtual reality. In some embodiments, a user may interact with the user interface 152 using a computing device distinct from and communicatively connected to at least a processor 102. For example, a smart phone, smart, tablet, or laptop operated by a user. In an embodiment, user interface 152 may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, processor 102 may render unified edit timeline 122 as a multi-track graphical display, wherein each track 150 corresponds to at least a primary track or one or more secondary tracks, and wherein each track 150 may be visually represented as a horizontal band segmented according to temporal intervals 134. Within each track 150, processor 102 may generate visual elements such as blocks, icons, or waveforms corresponding to content identifiers 118, modified waveform segments, or supplemental video segments. These elements may be positioned on user interface 152 according to their temporal alignment in unified edit timeline 122, enabling a user to visualize the sequence of edits. In some embodiments, processor 102 may generate interactive controls on user interface 152 that allow a user to modify unified edit timeline 122. For example, and without limitation, a user may select and drag a supplemental segment icon along the horizontal timeline to adjust its temporal position or resize its bounding box to adjust its duration. In some cases, processor 102 may update metadata within unified edit timeline 122 in real time in response to such user actions, thereby ensuring that changes made in user interface 152 are reflected in the underlying data structure. In some cases, user interface 152 may provide playback controls, such as play, pause, rewind, or scrub functionality, allowing a user to preview the modified video composition while simultaneously viewing the corresponding positions in unified edit timeline 122. Processor 102 may synchronize a playback cursor with displayed tracks 150, highlighting active temporal interval 134 of each element as the video is rendered. In some embodiments, processor 102 may generate contextual menus or tooltips that appear when a user interacts with a content identifier or supplemental segment. In some embodiments, user interface 152 may support collaborative editing, wherein multiple users interact with unified edit timeline 122 from distinct computing devices communicatively connected to processor 102 using a network. Processor 102 may manage synchronization of user inputs such that modifications made by one user are propagated to other users' interfaces in real time. In some cases, user interface 152 may be extended into immersive environments such as augmented reality or virtual reality, wherein unified edit timeline 122 is presented spatially, allowing a user to manipulate video elements using gestures, voice commands, or motion controllers.

Figure 2:
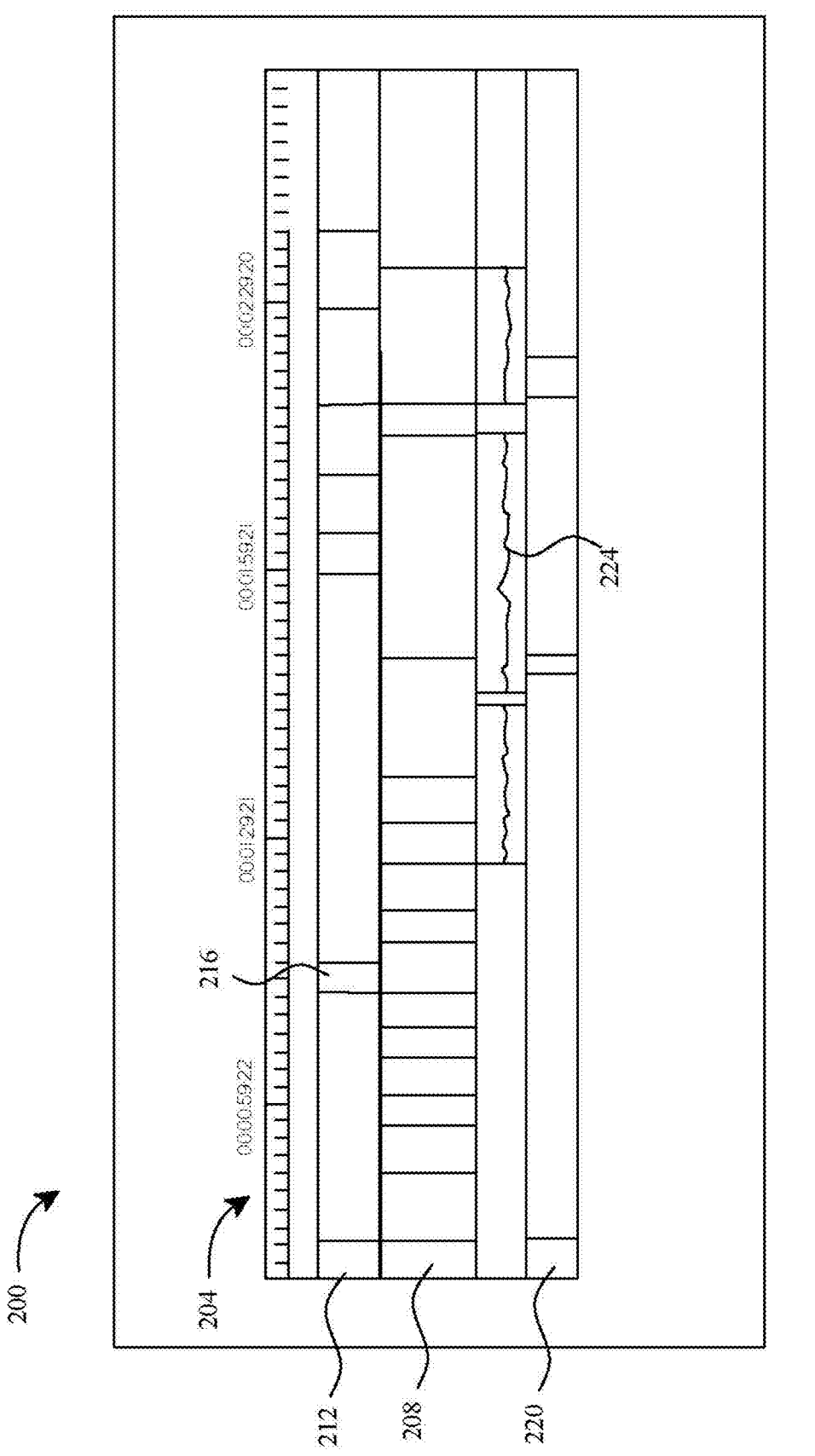
FIG. 2 illustrates an exemplary user interface.

Referring now to FIG. 2, an exemplary user interface 200 including unified edit timeline 204 is illustrated. In some cases, unified edit timeline 204 may be scrollable or zoomable to allow a user to navigate across temporal intervals of the video. In some cases, unified edit timeline 204 may include primary track 208 and secondary tracks 212. Primary track 208 may include raw content such as a plurality of image frames and corresponding modified speech waveform. Secondary track 212 may include an interval positioned along secondary track 212 at a temporal location corresponding to a portion of primary track 208. Supplemental segment 216 may represent a stored or generated B-roll clip, an overlay, a graphic element, or an animation. By aligning supplemental segment 216 with primary track 208, processor ensures that supplemental content is inserted into the edited video at a contextually relevant position. In some embodiments, primary track 208 may be segmented into intervals that align with content identifiers such as scene identifiers, speaker identifiers, or emotion identifiers. Each interval may be represented as a block or region within primary track 208, arranged in temporal order along unified edit timeline 204. Content identifier 220 may be represented as a labeled element aligned with one or more intervals in unified edit timeline 204. Content identifier 220 may correspond to a semantic annotation of raw content, such as a detected scene ("city street"), a speaker label ("Speaker A"), or an emotion state ("happiness"). Content identifier 220 may act as an anchor point, linking audio, video, and supplemental elements to semantic features extracted from the raw content. In some embodiments, unified edit timeline 204 may include representations of modified waveform 224. Modified waveform 224 may reflect filler word removal, amplitude normalization, or other edits performed by processor. User interface 200 may allow a user to interact with unified edit timeline 204 by selecting, dragging, trimming, or deleting intervals within primary track 208, secondary track 212, or supplemental segment 216. Such interactions may update the metadata of unified edit timeline 204 in real time, enabling both automated and user-guided editing to coexist within a single framework.

Figure 3:
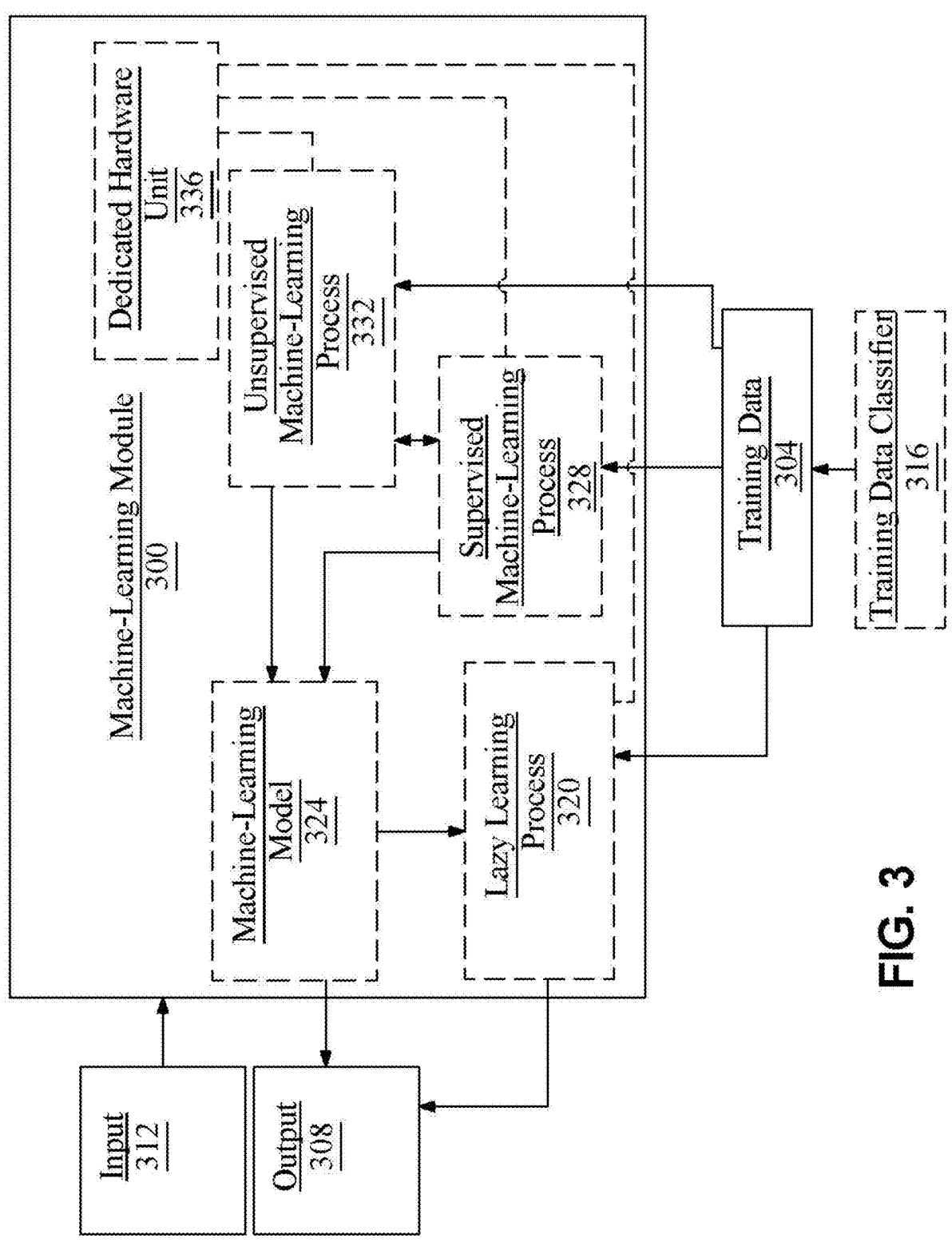
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include raw content, image frames, speech waveform, content features, content identifier, modified waveform, and the like. As a non-limiting illustrative example, output data may include content features, content identifier, modified waveform, supplemental segment, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to user cohort related to user's age, gender, occupation, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328.

At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include raw content, image frames, speech waveform, content features, content identifier, modified waveform, and the like as described above as inputs, content features, content identifier, modified waveform, supplemental segment, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
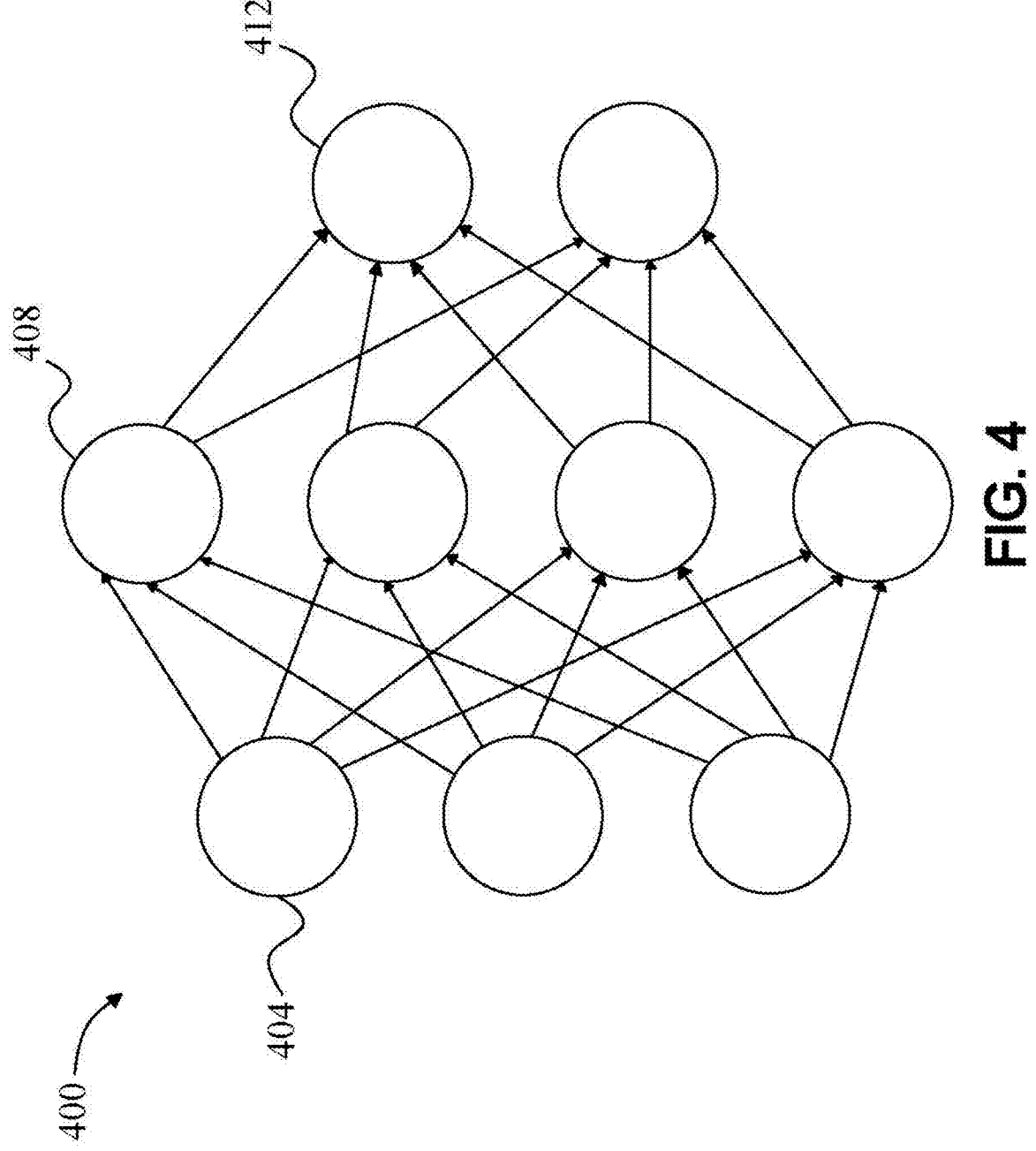
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
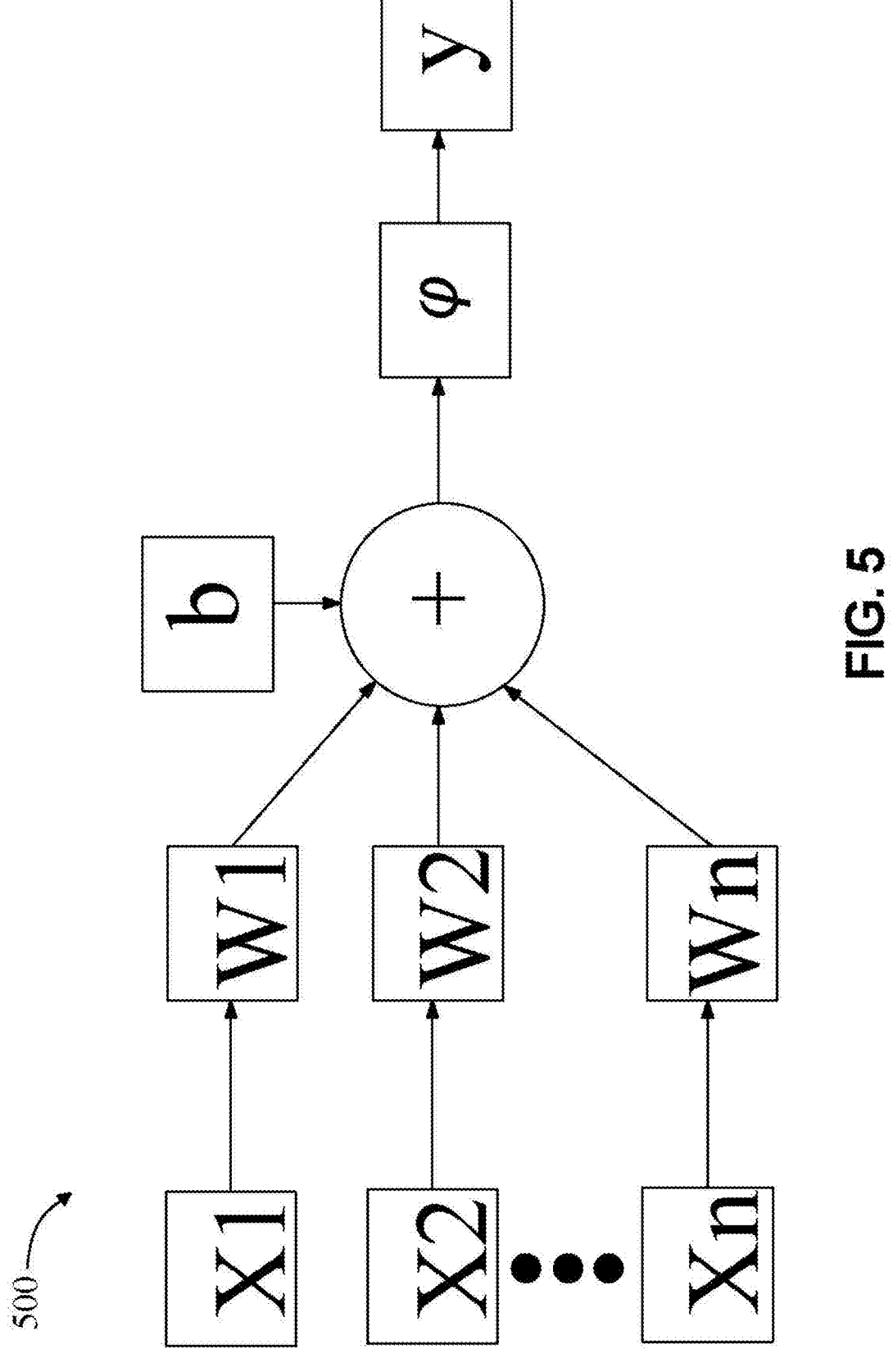
FIG. 5 illustrates a block diagram of an exemplary node in a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, $\alpha$ is a parameter to set the learning rate, and $$\frac{dJ}{dw}$$

is the partial derivative of with respect to weight w.

Figure 6:
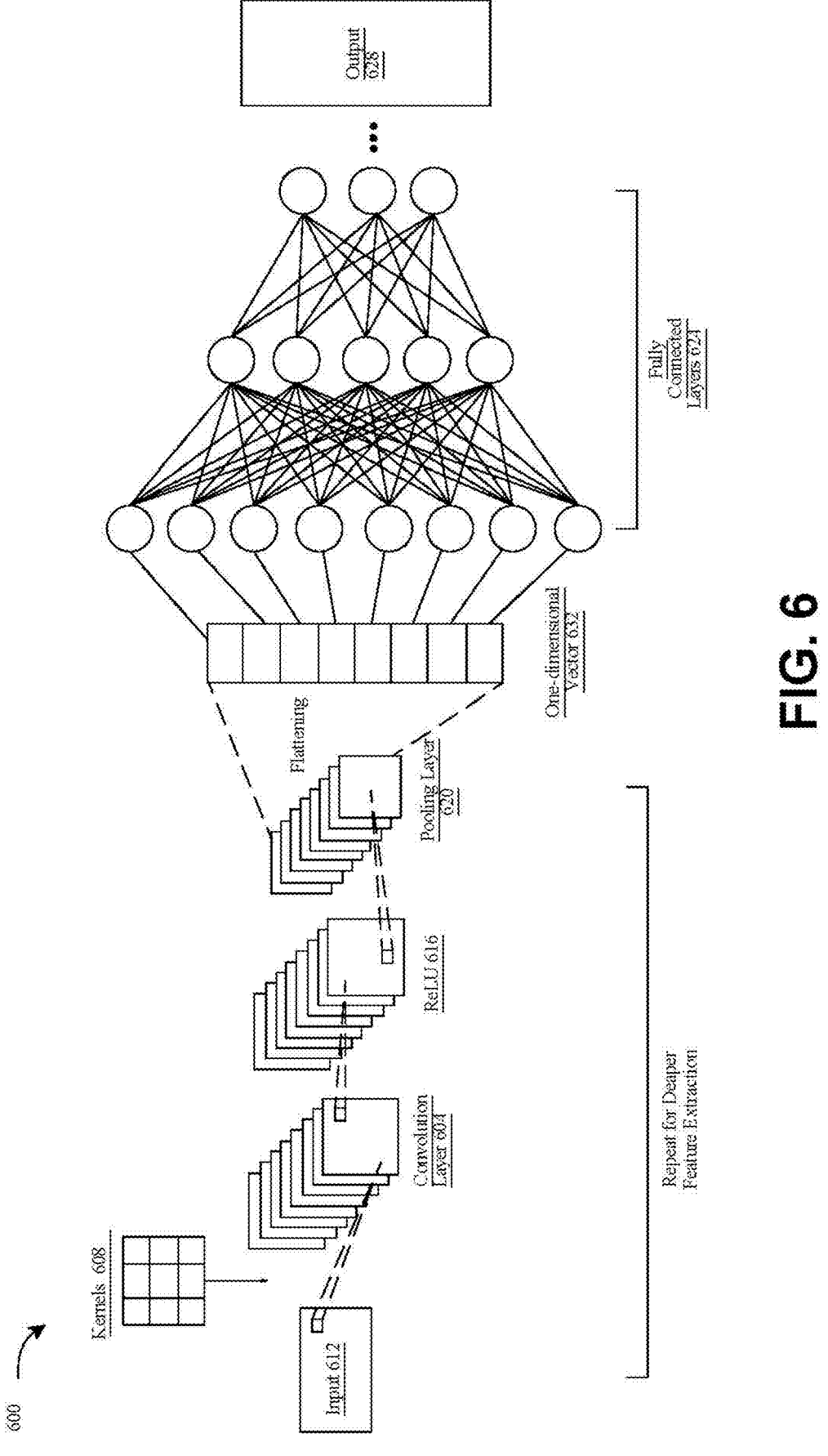
FIG. 6 illustrates a diagram of an exemplary convolution neural network.

Referring now to FIG. 6, in an embodiment, processor 102 may include a convolutional neural network (CNN) 600 designed to extract spatial hierarchies of features from input data through learned convolutional operations. For the purposes of this disclosure, a "convolutional neural network" is a neural network architecture characterized by the presence of one or more convolutional layers, where each convolutional layer performs localized operations to detect patterns within the input. A "kernel," for the purposes of this disclosure, is defined as a small matrix of learnable weights that slides across the input data, performing an element-wise multiplication and summation at each spatial location to generate a feature map. The convolution operation occurs explicitly within the convolutional layers 604, wherein each application of the kernel 608 detects specific localized features such as edges or simple textures by systematically scanning across the height and width of the input.

Still referring to FIG. 6, the convolutional layer 604 forms the first operation in a CNN 600, directly applying the kernel 608 over the input 612 through a sliding window mechanism. At each spatial location, the kernel 608 and the corresponding patch of input 612 are multiplied element-wise and summed, producing a single value within the resulting feature map. This process, repeated across the entire input 612, enables the CNN 600 to transform raw data into intermediate representations that highlight important local patterns. Following the convolution operation, the feature maps are passed through a non-linear activation function, such as a Rectified Linear Unit (ReLU) 616, to introduce non-linearity into the model, allowing for the learning of more complex and abstract features.

With continued reference to FIG. 6, additionally, or alternatively, CNN 600 may further include one or more pooling layers 620 configured to reduce the spatial dimensions of the generated feature maps while retaining the most salient information. For the purposes of this disclosure, a "pooling layer" is a layer that applies a fixed function to small regions of feature maps, summarizing the presence of features over localized areas. As a non-limiting example, the fixed function may include maximum selection or averaging. Pooling operations, such as max pooling, reduce the computational load for subsequent layers, improve generalization by promoting translation invariance, and help mitigate overfitting by condensing feature representations. In some embodiments, pooling layers 620 may be interleaved between multiple convolutional layers 604 to progressively abstract and distill the features extracted by the kernels 608 applied earlier in the network.

With continued reference to FIG. 6, in an embodiment, the sequence of convolutional and pooling layers 620 allows CNN 600 to learn increasingly complex feature hierarchies. Initial convolutional layers 604 may focus on simple patterns like edges and gradients, while deeper layers may combine these lower-level patterns into higher-level features representing meaningful parts of the input 612. Pooling layers 620, placed strategically throughout the network, ensure that the computational complexity remains manageable and that the learned representations are robust to small variations in the input 612. Thus, through the structured application of convolution and pooling operations, CNN 600 can achieve powerful feature extraction capabilities necessary for tasks such as image classification, object detection, and segmentation.

With continued reference to FIG. 6, in an embodiment, parameters associated with the convolution operation, such as stride and padding, may be utilized to control the spatial dimensions and structure of the resulting feature maps. For the purposes of this disclosure, a "stride" is defined as the number of pixels by which a kernel moves after each application of a convolution operation. In some embodiments, a stride of one may be used to ensure that the kernel 608 slides over the input 612 one pixel at a time, thereby producing a dense feature map. Increasing the stride value results in fewer applications of the kernel 608 across the input 612, which reduces the size of the feature map and can introduce a form of downsampling within the convolutional layer 604 itself. Additionally, or alternatively, "padding" may be applied to the input 612, wherein additional pixels, typically initialized to zero, are added around the boundary of the input 612. Padding may be used to preserve the spatial dimensions of the input 612 following the convolution operation, thereby ensuring that the feature maps retain sufficient resolution for deeper network layers. Through adjustment of stride and padding parameters, CNNs 600 may flexibly manage the resolution, computational cost, and abstraction of spatial features extracted from input 612.

With continued reference to FIG. 6, in an embodiment, CNN 600 may include a sequence of multiple convolutional and pooling layers 620 arranged in a hierarchical manner to enable progressively deeper feature extraction. In early layers, convolutional operations may detect simple spatial patterns such as edges and textures, while in deeper layers, the network may combine these lower-level patterns into more abstract representations, such as object parts or complex textures. Each successive convolutional layer 604 operates on the feature maps generated by the preceding layer, allowing the network to learn increasingly rich and complex feature hierarchies across multiple levels of abstraction. Pooling layers 620, interspersed between convolutional layers 604, serve to reduce the spatial dimensions of the feature maps, making it computationally feasible to construct deep architectures without an excessive increase in parameters or resource requirements. As a result, the depth of a CNN 600, enabled through the stacking of convolutional and pooling layers 620, provides the capacity to model intricate data relationships and perform high-level tasks such as image classification, object recognition, and segmentation with high accuracy and generalization capability.

With continued reference to FIG. 6, in an embodiment, after passing through multiple convolutional and pooling layers 620, the extracted features may be further processed by one or more fully connected layers 624 configured to perform high-level reasoning and generate final outputs 628 corresponding to specific tasks such as classification, detection, or regression. For the purposes of this disclosure, a "fully connected layer" is defined as a layer in which each neuron is connected to every neuron in the preceding layer, thereby enabling the combination of spatially distributed features into a comprehensive representation. In some embodiments, the feature maps output by the final pooling or convolutional layer 604 may be flattened into a one-dimensional vector 632 prior to being input into the fully connected layers 624. Fully connected layers 624 enable the CNN 600 to synthesize the learned spatial features into a global interpretation of the input 612, facilitating complex decision-making processes. Additionally, or alternatively, activation functions such as Rectified Linear Unit (ReLU) 616 may be applied within fully connected layers 624 to introduce non-linearity, and regularization techniques such as dropout may be employed to prevent overfitting by randomly disabling a subset of neurons during training.

Figure 7:
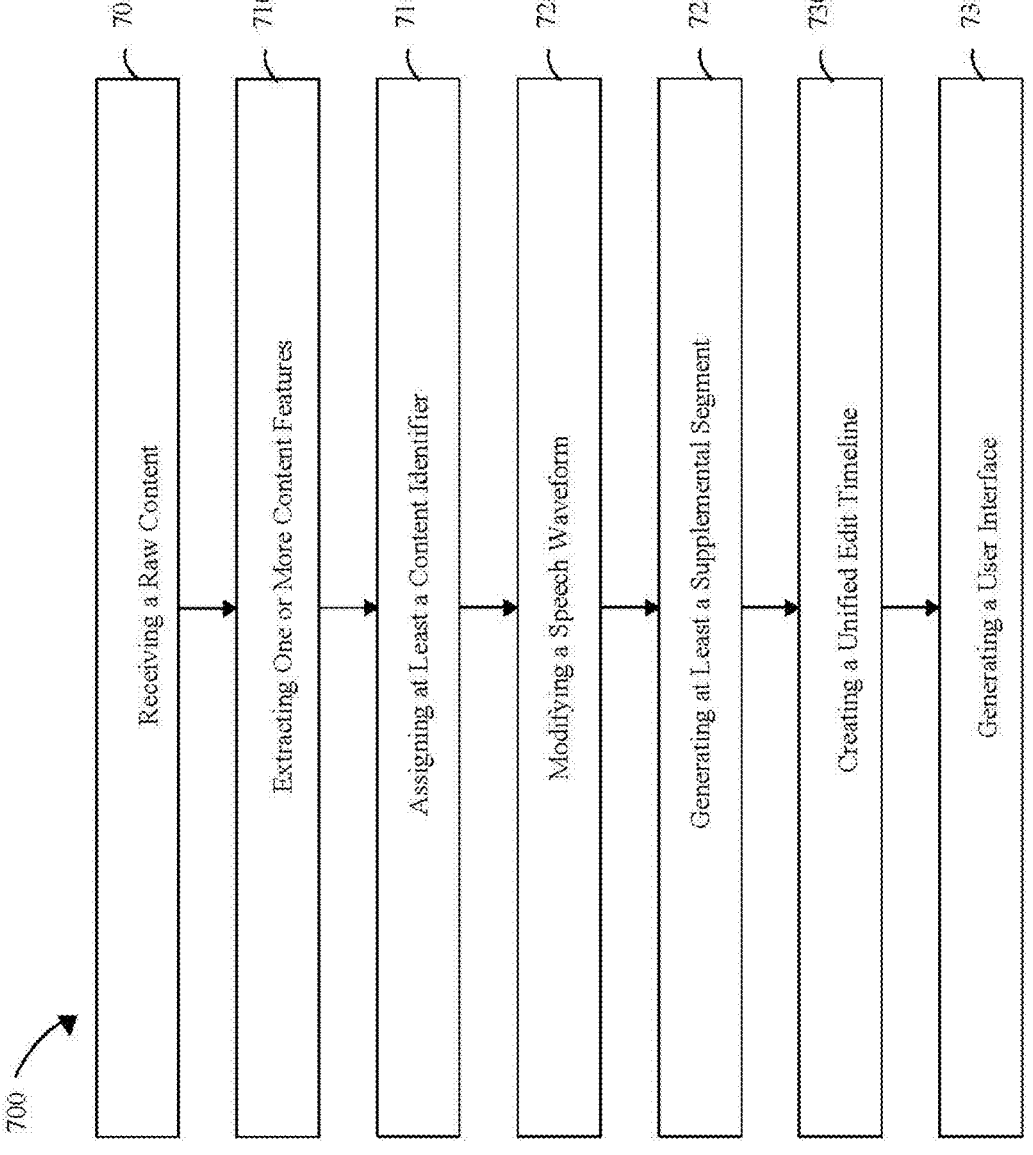
FIG. 7 illustrates a flow diagram of an exemplary method for automated video production.

Referring now to FIG. 7, a flow diagram of an exemplary method 700 for automated video production. Method 700 contains a step 705 of receiving, using at least a processor, raw content including a plurality of image frames and an associated speech waveform. This may be implemented as reference to FIGS. 1-6.

With continued reference to FIG. 7, method 700 contains a step 710 of extracting, using at least a processor, one or more content features from a plurality of image frames and an associated speech waveform. In some cases, extracting the one or more content features may include generating a transcript of the speech waveform using an automatic speech recognition module of the speech model, wherein the transcript is time-aligned with the plurality of image frames, and extracting the one or more content features from the transcript. In some cases, generating the transcript of the speech waveform may include receiving the speech waveform including speech data a plurality of different speakers, generating masked clusters of the speech waveform, converting the masked clusters into a time domain to obtain a plurality of separated speech signals corresponding to the plurality of different speakers, extracting one or more acoustic features of the one or more content features from a target speech signal, and generating a sequence of words from the one or more acoustic features to produce the transcript corresponding to the target speech signal. These may be implemented as reference to FIGS. 1-6.

With continued reference to FIG. 7, method 700 contains a step 715 of assigning, using at least a processor, at least a content identifier to at least a portion of raw content as a function of one or more content features. This may be implemented as reference to FIGS. 1-6.

With continued reference to FIG. 7, method 700 contains a step 720 of modifying, using at least a processor, a speech waveform to generate a modified waveform using a speech model, wherein generating the modified waveform includes detecting one or more filler words from the speech waveform and removing the one or more filler words from the speech waveform. In some cases, detecting the one or more filler words may include distinguishing the one or more filler words from the speech waveform based on a frequency difference in the one or more acoustic features. In some cases, modifying the speech waveform may include identifying temporal intervals within the speech waveform corresponding to the one or more filler words, removing the temporal intervals from the speech waveform to generate the modified waveform, and modifying the plurality of image frames to temporally align with the modified waveform. These may be implemented as reference to FIGS. 1-6.

With continued reference to FIG. 7, method 700 contains a step 725 of generating, using at least a processor, at least a supplemental segment that is contextually matched to at least a content identifier using a generative model, wherein generating the at least a supplemental segment includes inserting the at least a supplemental segment into a plurality of image frames at a position aligned with at least a content identifier. In some cases, generating the at least a supplemental segment may include selecting the at least a supplemental segment using a generative adversarial network of the generative model by comparing the one or more content features with a plurality of stored video segments, and inserting the at least a supplemental segment into the raw content at a position aligned with the one or more content features. These may be implemented as reference to FIGS. 1-6.

With continued reference to FIG. 7, method 700 contains a step 730 of creating, using at least a processor, a unified edit timeline including at least a content identifier, a modified waveform, and at least a supplemental segment. In some cases, assigning the at least a content identifier may include segmenting the speech waveform into a plurality of speaker-specific segments based on the plurality of speech signals, and assigning a speaker identifier of the at least a content identifier to each of the plurality of speaker-specific segments. In some cases, assigning the at least a content identifier may include extracting one or more visual features of the one or more content features from the plurality of image frames using a computer vision module, generating an embedding representation of the one or more visual features, classifying the embedding representation into one or more scene categories, and assigning a scene identifier of the at least a content identifier corresponding to the one or more scene categories to at least a portion of the raw content. In some cases, assigning the at least a content identifier may include generating an embedding representation of the one or more content features, classifying the embedding representation into one or more emotion categories, and assigning an emotion identifier of the at least a content identifier corresponding to the one or more emotion categories to at least a portion of the raw content. In some cases, creating the unified edit timeline may include segmenting the raw content into a plurality of discrete units as a function of the at least a content identifier, the modified speech waveform, and the at least a supplemental segment, and assigning the plurality of discrete units to one or more tracks within a timeline structure of the unified edit timeline, wherein the one or more tracks may include a primary track and at least one secondary track. These may be implemented as reference to FIGS. 1-6.

With continued reference to FIG. 7, method 700 contains a step 735 of generating, using at least a processor, a user interface including a unified edit timeline. These may be implemented as reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
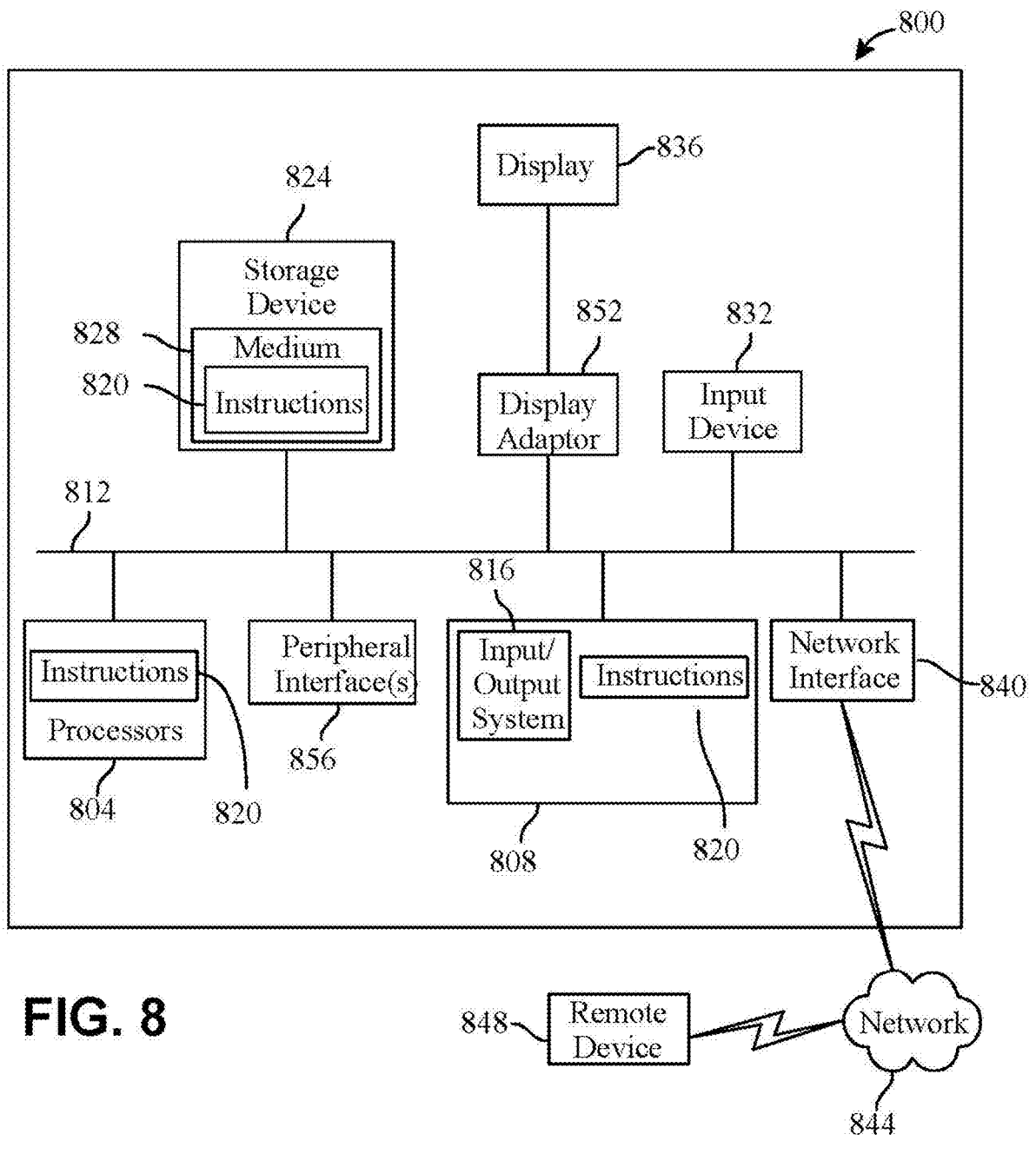
FIG. 8 illustrates a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof. Memory 808 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In some embodiments, storage device 824 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Further referring to FIG. 8, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 8, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 8, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 800, processor 804, and memory 808 may be virtualized; that is, a virtual machine and/or container may interact directly with such computing system 800, processor 804, and/or memory 808, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 804 comprises a plurality of processors and/or processor cores, virtualization may, in some cases, simulate or emulate a single (virtual) processor whose functions are allocated to one or more of the plurality of processors and/or processor cores. In this case, while processor 804 may be said to be virtualized, the processor 804, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automated video production, the apparatus comprising:
   at least a processor; and
   a memory communicatively connected to the at least a processor, wherein the memory contains instructions configuring the at least a processor to:
   receive raw content comprising a plurality of image frames and an associated speech waveform;
   extract one or more content features from the plurality of image frames and the associated speech waveform;
   assign at least a content identifier to at least a portion of the raw content as a function of the one or more content features;
   modify the speech waveform to generate a modified waveform using a speech model, wherein generating the modified waveform comprises:
      detecting one or more filler words from the speech waveform; and
      removing the one or more filler words from the speech waveform;
   generate at least a supplemental segment that is contextually matched to the at least a content identifier using a generative model, wherein generating the at least a supplemental segment comprises:
      inserting the at least a supplemental segment into the plurality of image frames at a position aligned with the at least a content identifier;

create a unified edit timeline comprising the at least a content identifier, the modified waveform, and the at least a supplemental segment; and
   generate a user interface comprising the unified edit timeline.

2. The apparatus of claim 1, wherein extracting the one or more content features comprises:
   generating a transcript of the speech waveform using an automatic speech recognition module of the speech model, wherein the transcript is time-aligned with the plurality of image frames; and
   extracting the one or more content features from the transcript.

3. The apparatus of claim 2, wherein generating the transcript of the speech waveform comprises:
   receiving the speech waveform comprising speech data from a plurality of different speakers;
   generating masked clusters of the speech waveform;
   converting the masked clusters into a time domain to obtain a plurality of separated speech signals corresponding to the plurality of different speakers;
   extracting one or more acoustic features of the one or more content features from a target speech signal; and
   generating a sequence of words from the one or more acoustic features to produce the transcript corresponding to the target speech signal.

4. The apparatus of claim 3, wherein detecting the one or more filler words comprises distinguishing the one or more filler words from the speech waveform based on a frequency difference in the one or more acoustic features.

5. The apparatus of claim 3, wherein assigning the at least a content identifier comprises:
   segmenting the speech waveform into a plurality of speaker-specific segments based on the plurality of speech signals; and
   assigning a speaker identifier of the at least a content identifier to each of the plurality of speaker-specific segments.

6. The apparatus of claim 1, wherein assigning the at least a content identifier comprises:
   extracting one or more visual features of the one or more content features from the plurality of image frames using a computer vision module;
   generating an embedding representation of the one or more visual features;
   classifying the embedding representation into one or more scene categories; and
   assigning a scene identifier of the at least a content identifier corresponding to the one or more scene categories to at least a portion of the raw content.

7. The apparatus of claim 1, wherein assigning the at least a content identifier comprises:
   generating an embedding representation of the one or more content features;
   classifying the embedding representation into one or more emotion categories; and
   assigning an emotion identifier of the at least a content identifier corresponding to the one or more emotion categories to at least a portion of the raw content.

8. The apparatus of claim 1, wherein modifying the speech waveform comprises:
   identifying temporal intervals within the speech waveform corresponding to the one or more filler words;
   removing the temporal intervals from the speech waveform to generate the modified waveform; and
   modifying the plurality of image frames to temporally align with the modified waveform.

9. The apparatus of claim 1, wherein generating the at least a supplemental segment comprises:

selecting the at least a supplemental segment using a generative adversarial network of the generative model by comparing the one or more content features with a plurality of stored video segments; and inserting the at least a supplemental segment into the raw content at a position aligned with the one or more content features.

10. The apparatus of claim 1, wherein creating the unified edit timeline comprises:

segmenting the raw content into a plurality of discrete units as a function of the at least a content identifier, the modified waveform, and the at least a supplemental segment; and assigning the plurality of discrete units to one or more tracks within a timeline structure of the unified edit timeline, wherein the one or more tracks comprises a primary track and at least one secondary track.

11. A method for automated video production, the method comprising:

receiving, using at least a processor, raw content comprising a plurality of image frames and an associated speech waveform;

extracting, using the at least a processor, one or more content features from the plurality of image frames and the associated speech waveform;

assigning, using the at least a processor, at least a content identifier to at least a portion of the raw content as a function of the one or more content features;

modifying, using the at least a processor, the speech waveform to generate a modified waveform using a speech model, wherein generating the modified waveform comprises:

detecting one or more filler words from the speech waveform; and removing the one or more filler words from the speech waveform;

generating, using the at least a processor, at least a supplemental segment that is contextually matched to the at least a content identifier using a generative model, wherein generating the at least a supplemental segment comprises:

inserting the at least a supplemental segment into the plurality of image frames at a position aligned with the at least a content identifier;

creating, using the at least a processor, a unified edit timeline comprising the at least a content identifier, the modified waveform, and the at least a supplemental segment; and generating, using the at least a processor, a user interface comprising the unified edit timeline.

12. The method of claim 11, wherein extracting the one or more content features comprises:

generating a transcript of the speech waveform using an automatic speech recognition module of the speech model, wherein the transcript is time-aligned with the plurality of image frames; and extracting the one or more content features from the transcript.

13. The method of claim 12, wherein generating the transcript of the speech waveform comprises:

receiving the speech waveform comprising speech data a plurality of different speakers;

generating masked clusters of the speech waveform;

converting the masked clusters into a time domain to obtain a plurality of separated speech signals corresponding to the plurality of different speakers;

extracting one or more acoustic features of the one or more content features from a target speech signal; and generating a sequence of words from the one or more acoustic features to produce the transcript corresponding to the target speech signal.

14. The method of claim 13, wherein detecting the one or more filler words comprises distinguishing the one or more filler words from the speech waveform based on a frequency difference in the one or more acoustic features.

15. The method of claim 13, wherein assigning the at least a content identifier comprises:

segmenting the speech waveform into a plurality of speaker-specific segments based on the plurality of speech signals; and assigning a speaker identifier of the at least a content identifier to each of the plurality of speaker-specific segments.

16. The method of claim 11, wherein assigning the at least a content identifier comprises:

extracting one or more visual features of the one or more content features from the plurality of image frames using a computer vision module;

generating an embedding representation of the one or more visual features;

classifying the embedding representation into one or more scene categories; and assigning a scene identifier of the at least a content identifier corresponding to the one or more scene categories to at least a portion of the raw content.

17. The method of claim 11, wherein assigning the at least a content identifier comprises:

generating an embedding representation of the one or more content features;

classifying the embedding representation into one or more emotion categories; and assigning an emotion identifier of the at least a content identifier corresponding to the one or more emotion categories to at least a portion of the raw content.

18. The method of claim 11, wherein modifying the speech waveform comprises:

identifying temporal intervals within the speech waveform corresponding to the one or more filler words;

removing the temporal intervals from the speech waveform to generate the modified waveform; and modifying the plurality of image frames to temporally align with the modified waveform.

19. The method of claim 11, wherein generating the at least a supplemental segment comprises:

selecting the at least a supplemental segment using a generative adversarial network of the generative model by comparing the one or more content features with a plurality of stored video segments; and inserting the at least a supplemental segment into the raw content at a position aligned with the one or more content features.

20. The method of claim 11, wherein creating the unified edit timeline comprises:

segmenting the raw content into a plurality of discrete units as a function of the at least a content identifier, the modified waveform, and the at least a supplemental segment; and assigning the plurality of discrete units to one or more tracks within a timeline structure of the unified edit timeline, wherein the one or more tracks comprises a primary track and at least one secondary track.

\* \* \* \* \*